(12) United States Patent
Cohen et al.

(10) Patent No.: US 7,545,359 B1
(45) Date of Patent: *Jun. 9, 2009

(54) COMPUTERIZED INTERACTOR SYSTEMS AND METHODS FOR PROVIDING SAME

(75) Inventors: Jonathan R. Cohen, San Francisco, CA (US); Debby Hindus, San Francisco, CA (US); Bonnie M. Johnson, Palo Alto, CA (US); Andrew J. Singer, Palo Alto, CA (US); Lisa J. Stifelman, Cambridge, MA (US); William L. Verplank, Menlo Park, CA (US); Scott C. Wallters, Cupertino, CA (US); M. Margaret Withgott, Los Altos Hills, CA (US)

(73) Assignee: Vulcan Patents LLC, Seattle, WA (US)

( * ) Notice: Subject to any disclaimer, the term of this patent is extended or adjusted under 35 U.S.C. 154(b) by 463 days.

This patent is subject to a terminal disclaimer.

(21) Appl. No.: 11/061,789

(22) Filed: Feb. 18, 2005

Related U.S. Application Data

(60) Continuation of application No. 09/823,628, filed on Mar. 30, 2001, now Pat. No. 6,940,486, which is a division of application No. 08/801,085, filed on Feb. 14, 1997, now Pat. No. 6,262,711, which is a continuation of application No. 08/692,830, filed on Jul. 29, 1996, now abandoned.

(60) Provisional application No. 60/001,875, filed on Aug. 3, 1995.

(51) Int. Cl.
*G09G 5/00* (2006.01)
*G09G 5/08* (2006.01)
(52) U.S. Cl. .................. 345/156; 345/157; 345/173
(58) Field of Classification Search ......... 345/156–169, 345/173–179; 178/18.01–18.07, 19.01–19.06
See application file for complete search history.

(56) References Cited

U.S. PATENT DOCUMENTS 3,673,327 A 6/1972 Johnson et al.

(Continued)

FOREIGN PATENT DOCUMENTS

DE 3008190 9/1981

(Continued)

OTHER PUBLICATIONS

Ishii, Hiroshi and Ullmer, Brygg, "Tangible Bits: Towards Seamless Interfaces Between People, Bits and Atoms":, Mar. 22-27, 1997 CHI.
Gorbet, Matthew G. et al, "Triangles: Tangible Interface for Manipulation and Exploration of Digital Information Topography", Apr. 18-23, 1998, CHI98.

(Continued)

*Primary Examiner*—Vijay Shankar
(74) *Attorney, Agent, or Firm*—Perkins Coie LLP

(57) ABSTRACT

A computerized interactor system uses physical, three-dimensional objects as metaphors for input of user intent to a computer system. When one or more interactors are engaged with a detection field, the detection field reads an identifier associated with the object and communicates the identifier to a computer system. The computer system determines the meaning of the interactor based upon its identifier and upon a semantic context in which the computer system is operating. The interactors can be used to control other systems, such as audio systems, or it can be used as intuitive inputs into a computer system for such purposes as marking events in a temporal flow. The interactors, as a minimum, communicate their identity, but may also be more sophisticated in that they can communicate additional processed or unprocessed data, i.e. they can include their own data processors. The detection field can be one-dimensional or multi-dimensional, and typically has different semantic meanings associated with different parts of the detection field.

20 Claims, 27 Drawing Sheets

U.S. PATENT DOCUMENTS

| | | |
|---|---|---|
| 3,891,829 A | 6/1975 | Dobras |
| 3,894,756 A | 7/1975 | Ward |
| 4,114,033 A | 9/1978 | Okamoto et al. |
| 4,172,969 A | 10/1979 | Levine et al. |
| 4,237,344 A | 12/1980 | Moore |
| 4,302,011 A | 11/1981 | Pepper, Jr. |
| 4,341,385 A | 7/1982 | Doyle et al. |
| 4,536,887 A | 8/1985 | Kaneda et al. |
| 4,597,495 A | 7/1986 | Knosby |
| 4,780,883 A | 10/1988 | O'Connor et al. |
| 4,843,568 A | 6/1989 | Krueger et al. |
| 4,866,765 A | 9/1989 | Yang et al. |
| 4,873,398 A | 10/1989 | Hubby, Jr. |
| 4,882,726 A | 11/1989 | Lang et al. |
| 4,887,204 A | 12/1989 | Johnson et al. |
| 4,893,305 A | 1/1990 | Fernandez et al. |
| 4,940,963 A | 7/1990 | Gutman et al. |
| 4,975,694 A | 12/1990 | McLaughlin et al. |
| 4,998,010 A | 3/1991 | Chandler et al. |
| 5,013,047 A | 5/1991 | Schwab |
| 5,047,614 A | 9/1991 | Bianco |
| 5,082,286 A | 1/1992 | Ryan et al. |
| 5,086,394 A | 2/1992 | Shapira |
| 5,088,928 A | 2/1992 | Chan |
| 5,188,368 A | 2/1993 | Ryan |
| 5,202,828 A | 4/1993 | Vertelney et al. |
| 5,231,649 A | 7/1993 | Duncanson |
| 5,257,307 A | 10/1993 | Ise et al. |
| 5,267,323 A | 11/1993 | Kimura et al. |
| 5,298,731 A | 3/1994 | Ett |
| 5,303,388 A | 4/1994 | Kreitman et al. |
| 5,330,380 A | 7/1994 | McDarren et al. |
| 5,335,011 A | 8/1994 | Addeo et al. |
| 5,337,358 A | 8/1994 | Axelrod et al. |
| 5,359,422 A * | 10/1994 | Fukushima ............... 358/296 |
| 5,360,446 A | 11/1994 | Kennedy |
| 5,396,265 A | 3/1995 | Ulrich et al. |
| 5,401,947 A | 3/1995 | Poland |
| 5,452,414 A | 9/1995 | Rosendahl et al. |
| 5,459,458 A | 10/1995 | Richardson et al. |
| 5,479,408 A | 12/1995 | Will |
| 5,481,610 A | 1/1996 | Doiron et al. |
| 5,483,261 A | 1/1996 | Yasutake |
| 5,487,181 A | 1/1996 | Dailey et al. |
| 5,511,148 A | 4/1996 | Wellner |
| 5,525,798 A | 6/1996 | Berson et al. |
| 5,537,336 A | 7/1996 | Joyce |
| 5,545,883 A | 8/1996 | Sasou et al. |
| 5,550,561 A | 8/1996 | Ziarno |
| 5,561,446 A | 10/1996 | Montlick |
| 5,572,643 A | 11/1996 | Judson |
| 5,586,216 A | 12/1996 | Degen et al. |
| 5,590,396 A | 12/1996 | Henry |
| 5,600,115 A | 2/1997 | Balzano |
| 5,604,516 A | 2/1997 | Herrod et al. |
| 5,607,336 A | 3/1997 | Lebensfeld et al. |
| 5,640,193 A | 6/1997 | Wellner |
| 5,644,627 A | 7/1997 | Segal et al. |
| 5,646,524 A | 7/1997 | Gilboa et al. |
| 5,651,049 A | 7/1997 | Easterling et al. |
| 5,664,015 A | 9/1997 | Ford et al. |
| 5,666,215 A | 9/1997 | Fredlund et al. |
| 5,670,987 A | 9/1997 | Doi et al. |
| 5,674,003 A | 10/1997 | Andersen et al. |
| 5,684,885 A | 11/1997 | Cass et al. |
| 5,689,641 A | 11/1997 | Ludwig et al. |
| 5,693,693 A | 12/1997 | Auslander et al. |
| 5,729,251 A | 3/1998 | Nakashima |
| 5,733,131 A | 3/1998 | Park |
| 5,734,724 A | 3/1998 | Kinoshita et al. |
| 5,739,814 A * | 4/1998 | Ohara et al. ............... 345/173 |
| 5,765,151 A | 6/1998 | Senator |
| 5,790,138 A | 8/1998 | Hsu |
| 5,802,488 A | 9/1998 | Edatsune et al. |
| 5,804,803 A | 9/1998 | Cragun et al. |
| 5,815,142 A | 9/1998 | Allard et al. |
| 5,826,253 A | 10/1998 | Bredenberg |
| 5,832,119 A | 11/1998 | Rhoads |
| 5,839,054 A | 11/1998 | Wright et al. |
| 5,841,978 A | 11/1998 | Rhoads |
| 5,848,413 A | 12/1998 | Wolff |
| 5,862,321 A | 1/1999 | Lamming et al. |
| 5,862,429 A | 1/1999 | Ueno et al. |
| 5,869,819 A | 2/1999 | Knowles et al. |
| 5,886,337 A | 3/1999 | Rockstein et al. |
| 5,894,506 A | 4/1999 | Pinter |
| 5,903,729 A | 5/1999 | Reber et al. |
| 5,959,543 A | 9/1999 | LaPorta et al. |
| 5,970,122 A | 10/1999 | LaPorta et al. |
| 6,098,882 A | 8/2000 | Antognini et al. |
| 6,199,048 B1 | 3/2001 | Hudetz et al. |
| 6,262,711 B1 * | 7/2001 | Cohen et al. ............... 345/156 |
| 6,282,206 B1 | 8/2001 | Hindus et al. |
| 6,938,074 B2 | 8/2005 | Bettis |
| 6,940,486 B2 * | 9/2005 | Cohen et al. ............... 345/156 |
| 6,956,497 B1 | 10/2005 | Hindus et al. |
| 7,177,954 B1 | 2/2007 | van Allen et al. |
| 2001/0008398 A1 * | 7/2001 | Komata ............... 345/156 |

FOREIGN PATENT DOCUMENTS

| | | |
|---|---|---|
| DE | 3813779 A1 | 11/1989 |
| EP | 0576187 | 6/1992 |
| EP | 0606790 A2 | 7/1994 |
| FR | 2607400 | 11/1986 |
| GB | 2103943 | 7/1981 |
| GB | 2226468 A | 6/1990 |
| GB | 2237514 | 5/1991 |
| JP | 4010743 | 1/1992 |
| JP | 07093567 | 4/1995 |
| JP | 07108786 | 4/1995 |
| JP | 09204389 | 8/1997 |
| JP | 10171758 | 6/1998 |
| SU | 844011 | 7/1979 |
| WO | WO 9216913 A | 10/1992 |
| WO | WO 97/01137 | 1/1997 |
| WO | WO 97/32262 | 9/1997 |
| WO | WO 98/03923 | 1/1998 |

OTHER PUBLICATIONS

Wellner, Pierre et al, "Computer-Augmented Environments: Back to the Real World Introduction", vol. 36, No. 7, Communications of the ACM, Jul. 1993.

Durrell Bishop Letter, Nov. 18, 1996, "Portable Self-Checkout Retain System"; IBM Tech. Disclosure Bulletin, vol. 35 No. 1A, Jun. 1992.

Netscape Quick Tour; "Accessing & Navigating the Internet's World Wide Web", 1995.

Gorbet, Matthew et al, "Triangles: Tangible Interface for Manipulation and Exploration of Digital Information Topography", Nov. 1, 1998, Triangles—CHI98.

Bar Code Hotel, Nov. 1, 1998.

Poyner, Rick, "The Hand that Rocks the Cradle", May-Jun. 1995, I.D.

Spreitzer, Mike et al, "Scalable, Secure, Mobile Computing with Location Information", vol. 36, No. 7, Communications of the ACM, Jul. 1993.

Baudel, Thomas et al, "Charade: Remote Control of Objects using Free-Hand Gestures", vol. 36, No. 7, Communications of the ACM, Jul. 1993.

Krueger, Myron W., "Environmental Technology: Making the Real World Virtual", vol. 36, No. 7, Communications of the ACM, Jul. 1993.

Fitzmaurice, George W., "Situated Information Spaces and Spatially Aware Palmtop Computers", vol. 36, No. 7, Communications of the ACM, Jul. 1993.

Azuma, Ronald, "Tracking Requirements for Augmented Reality", vol. 36, No. 7, Communications of the ACM, Jul. 1993.

Feiner, Steven, "Knowledge-Based Augmented Reality", vol. 36, No. 7, Communications of the ACM, Jul. 1993.

Resnick, Mitchel, "Behavior Construction Kits", vol. 36, No. 7, Communications of the ACM, Jul. 1993.

Gold, Rich, "This is not a Pipe", vol. 36, No. 7, Communications of the ACM, Jul. 1993.

Weiser, Mark, "Some Computer Science Issues in Ubiquitous Computing", vol. 36, No. 7, Communications of the ACM, Jul. 1993.

Elrod, Scott, et al, "Responsive Office Environments", vol. 36, No. 7, Communications of the ACM, Jul. 1993.

Wellner, Pierre, "Interacting with Paper on the Digital Desk", vol. 36, No. 7, Communications of the ACM, Jul. 1993.

Technical Description of Knuer's "Station", Mar. 1996.

Fitzmaurice, George W., "Situated Information Spaces and Spatially Aware Palmtop Computers", vol. 36, No. 7, Communications of the ACM, Jul. 1993.

Mackay, Wendy et al, "Augmenting Reality: Adding Computational Dimensions to Paper", vol. 36, No. 7, Communications of the ACM, Jul. 1993.

Fitzmaurice, George W., "Bricks: Laying the Foundations for Graspable User Interfaces", Human Factors in Computering Systems, CHI'95 Conf. Proceedings, Denver, May 7-11, 1995, p. 442-449.

Tanigawa, H., et al, "Personal Multimedia-Multipoint Teleconference System", Networking in the Nineties, Bal Harbour, vol. 3, Apr. 7, 1991, IEEE, p. 1127-1134.

U.S. Appl. No. 11/178,255, filed Jul. 8, 2005, Hindus et al.

Knufer, "Technical Description of Dnufer's 'Station'," Mar. 1996, 11 pages.

* cited by examiner

| Current | Last | Meaning |
|---------|------|---------|
| 0 | 0 | No Piece |
| 1 | 1 | Piece Down |
| 1 | 1 | Piece Still Down |
| 0 | 0 | Piece Up |

FIG. 8b

COMPUTERIZED INTERACTOR SYSTEMS AND METHODS FOR PROVIDING SAME

CROSS-REFERENCE TO RELATED APPLICATION

This application is a continuation of U.S. patent application Ser. No. 09/823,628, entitled COMPUTERIZED INTERACTOR SYSTEMS AND METHODS FOR PROVIDING SAME filed Mar. 30, 2001 now U.S. Pat. No. 6,940,486 which is incorporated herein by reference for all purposes, which is a divisional of U.S. patent application Ser. No. 08/801,085 (now U.S. Pat. No. 6,262,711), entitled COMPUTERIZED INTERACTOR SYSTEMS AND METHODS FOR PROVIDING SAME filed Feb. 14, 1997 which is incorporated herein by reference for all purposes, which is a continuation of U.S. patent application Ser. No. 08/692,830, entitled COMPUTERIZED INTERACTOR SYSTEMS AND METHODS FOR PROVIDING SAME filed Jul. 29, 1996 now abandoned which is incorporated herein by reference for all purposes, which claims priority to U.S. Provisional Application No. 60/001,875, entitled COMPUTERIZED INTERACTOR SYSTEMS AND METHODS FOR PROVIDING SAME filed Aug. 3, 1995 which is incorporated herein by reference for all purposes.

BACKGROUND OF THE INVENTION

This invention relates generally to human/computer interfaces and more particularly to mechanical input devices for computerized systems.

It has become increasingly common to computerize systems, from the trivial (e.g., the computerized toaster or coffee pot) to the exceedingly complex (e.g., complicated telecommunications and digital network systems). The advantage of computerization is that such systems become more flexible and powerful. However, the price that must be paid for this power and flexibility is, typically, an increase in the difficulty of the human/machine interface.

The fundamental reason for this problem is that computers operate on principles based on the abstract concepts of mathematics and logic, while humans tend to think in a more spatial manner. People inhabit the real world, and therefore are more comfortable with physical, three-dimensional objects than they are with the abstractions of the computer world. Since people do not think like computers, metaphors are adopted to permit people to effectively communicate with computers. In general, better metaphors permit more efficient and medium independent communications between people and computers.

There are, of course, a number of human/computer interfaces which allow users, with varying degrees of comfort and ease, to interact with computers. For example, keyboards, computer mice, joysticks, etc. allow users to physically manipulate a three-dimensional object to create an input into a computer system. However, these human/computer interfaces are quite artificial in nature, and tend to require a substantial investment in training to be used efficiently.

Progress has been made in improving the human/computer interface with the graphical user interface (GUI). With a GUI interface, icons are presented on a computer screen which represent physical objects. For example, a document file may look like a page of a document, a directory file might look like a file folder, and an icon of a trash can be used for disposing of documents and files. In other words, GUI interfaces use "metaphors" where a graphical icon represents a physical object familiar to users. This makes GUI interfaces easier to use for most users. GUI interfaces were pioneered at such places as Xerox PARC of Palo Alto, Calif. and Apple Computer, Inc. of Cupertino, Calif. The GUI is also often commonly used with UNIX™ based systems, and is rapidly becoming a standard in the PC-DOS world with the Windows™ operating system provided by Microsoft Corporation of Redmond, Wash.

While GUIs are a major advance in human/computer interfaces, they nonetheless present a user with a learning curve due to their still limited metaphor. In other words, an icon can only represent a physical object: it is not itself a physical object. Recognizing this problem, a number of researchers and companies have come up with alternative human/computer interfaces which operate on real-world metaphors. Some of these concepts are described in the July, 1993 special issue of *Communications of the ACM*, in an article entitled "Computer Augmented Environments, Back to the Real World." Such computer augmented environments include immersive environments, where rooms are filled with sensors to control the settings of the room, as researched at New York University (NYU) in New York, N.Y. Another example is the electronic white boards of Wacom and others where ordinary-looking erasers and markers are used to create an electronic "ink." Wellner describes a "DigitalDesk" that uses video cameras, paper, and a work station to move between the paper and the electronic worlds. Fitzmarice has a "Chameleon" unit which allows a user to walk up to a bookshelf and press a touch-sensitive LCD strip to hear more about a selected book. Finally, MIT Media Lab has a product known as Leggo/Logo which lets children program by snapping plastic building blocks together, where each of the building blocks includes an embedded microprocessor.

Bishop, who is a co-inventor of the invention described and claimed herein, has developed a "marble answering machine" which appears to store a voice mail message in a marble that drops into a cup. The marble, in fact, triggers a pointer on a small computer which stores the message. To play back the message, the marble is dropped into the machine again.

This marble answering machine has been publicly known at least as of June, 1993. While strides have been made in attempting to improve human/computer interfaces, there is still progress to be made in this field. Ultimately, the interface itself should disappear from the conscious thought of users so that they can intuitively accomplish their goals without concern to the mechanics of the interface or the underlying operation of the computerized system.

SUMMARY OF THE INVENTION

The present invention improves the human-computer interface by using "interactors." An interface couples a detection field to a controller computer system which, in turn, may be coupled to other systems. When an interactor is entered into the detection field, moved about within the detection field, or removed from the detection field, an event is detected which, when communicated to the computer system, can be used to create a control signal for either the controller computer system or to a system connected to the controller computer system. Preferably, the detection field is suitably sized and configured so that multiple users can simultaneously access the field and such that multiple interactors can be engaged with the field simultaneously.

By "interactor" it is meant that a physical, real world object is used that can convey information both to the controller computer system and to users. An interactor can provide identity (ID) information to the computer through an embedded computer chip, a bar code, etc. An object can also be made into an interactor by embedding higher-level logic, such as a program logic array, microprocessor, or even a full-blown microcomputer. An interactor forms part of a system wherein information is assigned by users to at least one object.

An interactor system in accordance with the present invention includes a detection space and a number of interactors which can be manually manipulated within the detection space. The interactors preferably have a unique ID. An interface responsive to the interactors in the detection space provides signals to communicate information concerning the interactors (e.g. ID, position, EXIT/ENTER, and "temporal" information) to the computer system. The EXIT/ENTER will often be referred to as UP/DOWN when referring to a two dimensional detection field, since an interactor is entered by putting it down on the field, and is exited by picking it up from the field. Importantly, the computer system processes the information within a semantic context to accomplish a user-desired task. By "semantic", it is meant that the meaning of an interactor is dependent upon the context in which it is being used, both in terms of explicit and implicit assignments of function and content.

As will be appreciated from the above discussion, a method for controlling a computerized system includes the steps of: a) providing a detection space; b) placing a physical, identifiable interactor having a semantic meaning within the detection space; c) determining the meaning of the interactor within the semantic context; and d) controlling a computerized system in response to the semantic meaning of the interactor.

There are a number of specific applications for the interactor technology of the present invention. Two examples are given, one which allows for the control of an audio system to create a "virtual room", and the other which provides an event marking system for recorded media or other time based activities.

In the first example, an audio system is provided which can bring a number of widely dispersed individuals together into a common auditory space. For example, the audio system can provide a "virtual room" in which individuals are brought together in the auditory sense from various locations. For example, individuals A, B, and C can be in separate physical offices, yet individual A might wish to casually chat with individuals B and C as if they were in the same office space. Individual A then uses interactors representing B and C (perhaps with their pictures on them) in a detection field to indicate that he wishes to converse with individuals B and C. The interactors detected by the detection field generate control signals within a controlling computer to control microphones, speakers, and amplifiers to make this happen. In this fashion, and by a very simple metaphor, A, B, and C can be made to inhabit the same "virtual room" for conversation and other auditory communication.

In the second example, a videotape "marking" system is described. A videotape player is coupled to a controlling computer, and a videotape is played and observed by one or more users on a monitor. When an event occurring on the videotape is to be logged or marked, an interactor is engaged with the detection field. The controlling computer then retrieves timing information from the videotape player and combines this with the marking event. Removal of the interactor from the detection field can signify the end of the event, or can signify nothing, depending upon the context and the desires of the users. The detection field is preferably sized and configured so that multiple viewers of the video playback can simultaneously access the detection field. By taking a group approach, each individual can be watching for and marking a specific event or a small group of events. This approach can reduce the fatigue and tedium with logging videotape.

By using interactors, the human/computer interface is greatly enhanced. In the example of the audio control system, it takes little or no training to use the system since the interactors and their spatial relationships are intuitive to the user. Likewise, it is a very physically intuitive gesture for a user to place a labeled or otherwise evocative interactor on a detection field in response to a certain event detected in a video playback. The present invention therefore provides a more intuitive and richer metaphor for the interaction between humans and computerized systems. Furthermore, the present invention provides a system whereby multiple users simultaneously communicate with a computerized system using the metaphor.

These and other advantages of the present invention will become apparent upon reading the following detailed descriptions and studying the various figures of the drawings.

BRIEF DESCRIPTION OF THE DRAWINGS

FIG. 8b is a table illustrating the meanings associated with the state bit of the data word of FIG. 8a;

DETAILED DESCRIPTION OF THE PREFERRED EMBODIMENTS

Figure 1:
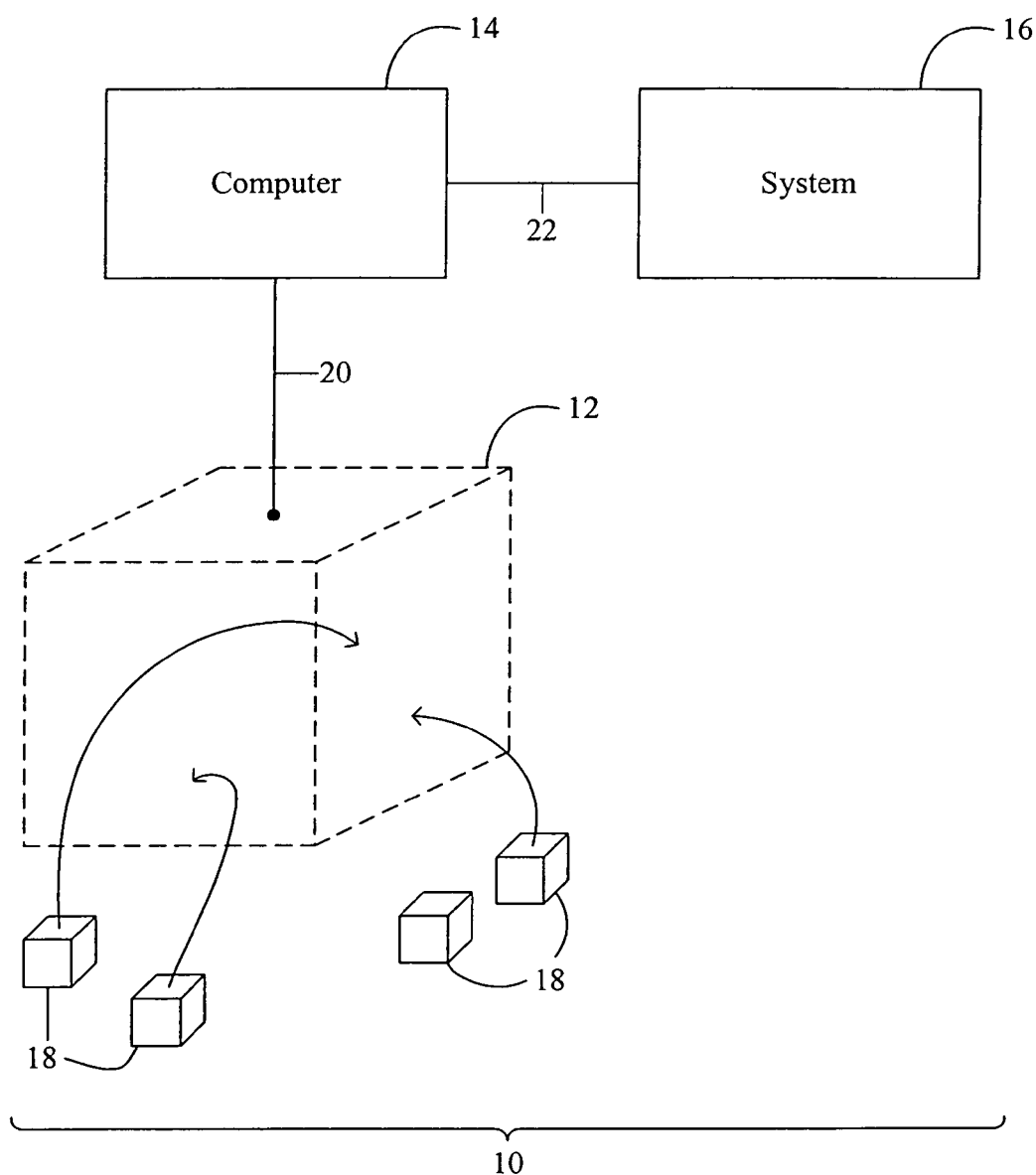
FIG. 1 is a pictorial representation of an interactor system in accordance with the present invention.

In FIG. 1, an interactor system 10 includes a detection space 12, a controller computer 14, and an optional system 16. A number of interactors 18 (which will be discussed more fully hereafter) may be engaged with, moved around in, and removed from the detection space 12. These interactors 18 in conjunction with the detection space 12 help define a human/computer interface that is intuitive, flexible, rich in meaning, and is well adapted for use by multiple simultaneous users.

As used herein, the term "detection space" or the like will refer to any n-dimensional space in the physical world. The detection space will be alternatively referred to as a "detection field," an "event field," and the like. Therefore, such terms as "space," "field," "domain," "volume," should be considered as synonymous as used herein. However, "field" will be used more frequently with respect to a two dimensional detection space, while "space" will be used more frequently with respect to a three dimensional detection space.

Since we live in a three-dimensional world, any real-world detection space will have a three-dimensional aspect. However, if only two of those dimensions are used as input to the computer 14, we will refer to the detection field as a "two dimensional." Likewise, if only one-dimension is used as an input to computer 14, we will refer herein to such a field as "one dimensional." Furthermore, in certain embodiments of the present invention, the detection space may be time-variant, allowing the inclusion of four dimensional detection spaces. Various examples of detection spaces and fields will be discussed in greater detail subsequently.

Computer 14 is preferably a general purpose microcomputer made by any one of a variety of commercial vendors. For example, computer 14 can be a Macintosh computer system made by Apple Computer, Inc. or a PC/AT compatible DOS computer system made by Compaq, IBM, Packard-Bell, or others. Computer 14 is coupled to the detection space 12 as indicated at 20 such that it may receive information concerning an interactor 18 placed within the detection space 12. An interface is provided between the detection space 12 and the computer 14 which may be either internal to or external of the computer system 14. The design and implementation of interfaces is well known to those skilled in the art, although a preferred implementation of an interface of the present invention will be discussed in greater detail subsequently.

By coupling the optional system 16 to computer 14, interactors and the optional system 16 can interact within controller computer 14. The system 16 may serve as an input to computer 14, an output from computer 14, or both. When used as an input to computer 14, the system 16 can provide data on a line 22 which is used in conjunction with data on line 20 derived from the interaction of an interactor 18 with the detection space 12. When used as an output from the computer system 14, the system 16 can be controlled by the interaction of the interactor 18 with the detection space 12.

The system 16 can be of a standard commercial design (e.g. a videotape player), or can be a custom system designed for a particular use.

Figure 2:
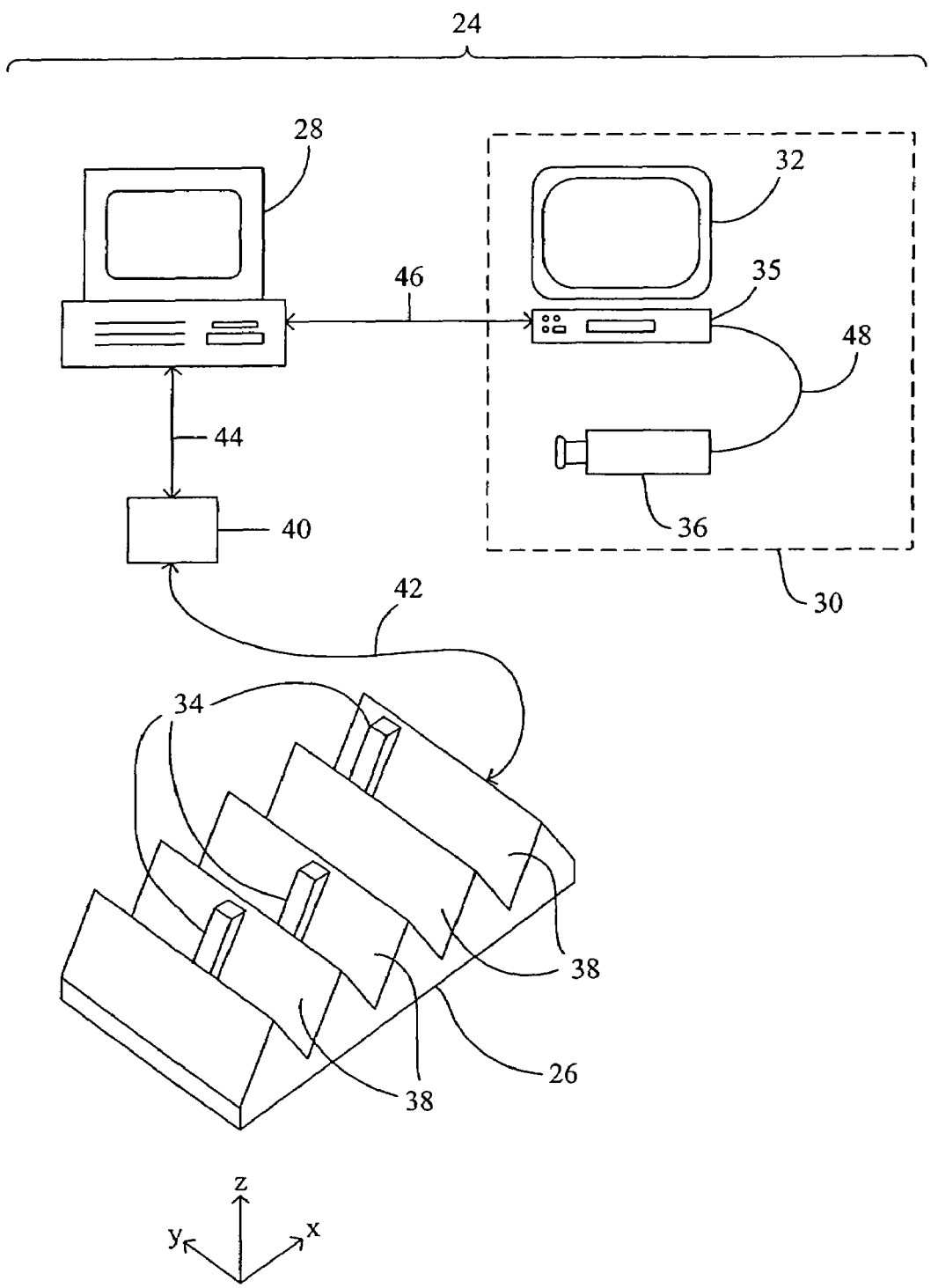
FIG. 2 is a pictorial representation of a first preferred embodiment of the present invention.

An interactor system 24 used to mark events in a temporal flow is illustrated somewhat schematically in FIG. 2. The interactor system 24 includes a detection field 26, a computer 28, and a video system 30. With the interactor system 24, a videotape or other video source can be displayed on a screen 32 of the video system 30 and events can be "marked" by engaging interactors 34 with the detection field 26. The images on video screen 32 may be recorded such as within a recording/playback unit 35 of the video system 30, or may be purely transitory images, such as those produced by a video camera 36 of the video system 30. If recorded, the images can be "marked" contemporaneously with recording of the image, or after the fact. In the latter instance, the unit 35 would simply be used in its playback mode to playback an earlier recorded video tape for event marking.

The detection field 26 is, in this embodiment, a two-dimensional detection field in that it can detect positions of interactors 34 in both an "x" and a "y" direction. However, the detection field 26 of FIG. 2 does not detect vertical displacement from the detection field (i.e. in the z-direction) in this present embodiment. The detection field 26 is provided with four, V-shaped channels 38 which permit the interactors 34 to be engaged with the detection field 26 at a convenient angle. A number (e.g. 12) of interactors 34 can be engaged with each of the channels 38.

The detection field 26 is coupled to the computer 28 by an interface 40. More particularly, a first cable 42 couples the detection field 26 to the interface 40, and a second cable 44 couples the interface 40 to the computer 28. The construction and operation of both the detection field 26 and interface 40 will be described in greater detail subsequently.

The video system 30 is coupled to computer 28 by a cable 46. Preferably, the computer 28 includes an internal video interface card which engages with a suitable connector at one end of the cable 46. Other embodiments have other arrangements for connecting the video system to the computer. Video systems 30 and video system interface cards (not shown) are commercially available from such sources as Radius Corporation of California. The video camera 36 can be coupled to the record/playback unit 35 by a cable 48, or can be directly coupled into the computer 28 through the aforementioned video interface card (not shown). Video cameras such as video camera 36 are available from a number of manufacturers including Sony Corporation of Japan.

Figure 3:
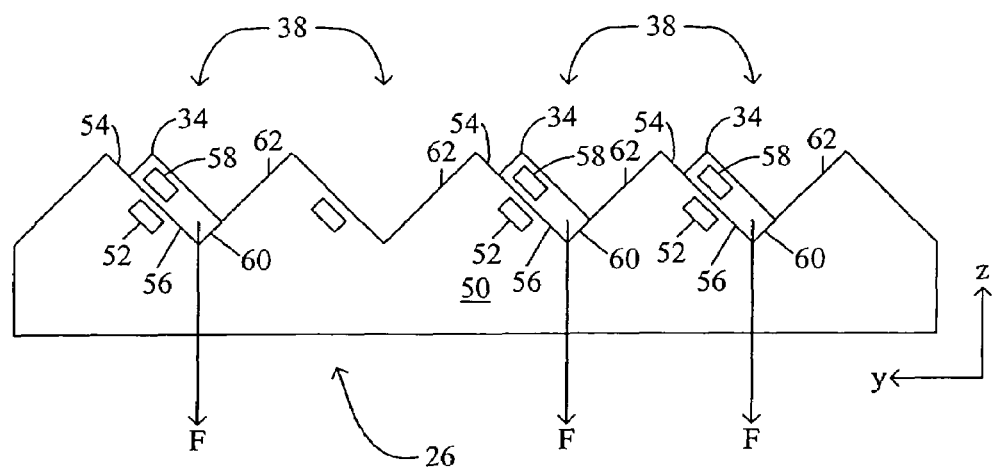
FIG. 3 is a side elevational view of a two-dimensional detection field in accordance of the present invention.

FIG. 3 is a side elevational view of detection field 26. Shown engaged with three of the four V-shaped channels 38 are interactors 34. Again, while only one interactor is shown engaged with each of channels 38, a number of interactors 34 (e.g. 12) can be simultaneously engaged with each of the channels. The body 50 of the detection field 26 is preferably made from an insulating material such as wood or plastic.

In a preferred embodiment of the present invention, a plurality of permanent magnets 52 are provided in a first wall 54 of each of the V-shaped channels 38 corresponding, one each, with positions where interactors can be engaged with the channels. The backs 56 of interactors 34 are adapted to engage the walls 54 of the channels, i.e. preferably both the walls 54 of the channels and the backs 56 of the interactors are planar in configuration. Each of the interactors 34 are also provided with a magnet 58 which is attracted to a magnet 52 when the back 56 of the interactor 34 is engaged with a wall 54 of the V-shaped channel 38. This is accomplished by having opposing (N/S) poles of magnets 52 and 58 face each other when the interactor 34 is engaged with the channel 38.

Since the magnets 52 and 58 are slightly offset in the vertical sense when the interactor 34 is engaged with the channel 38, a force F is exerted on each of the interactors 34 to firmly hold the back 56 against the wall 54 and to firmly hold a base 60 of the interactor 34 against an abutting wall 62 of the V-shape channels 38. Therefore, the magnets not only hold the interactors 34 in position, they also ensure good contact between abutting surfaces of the interactor 34 and channel 38.

Figure 4:
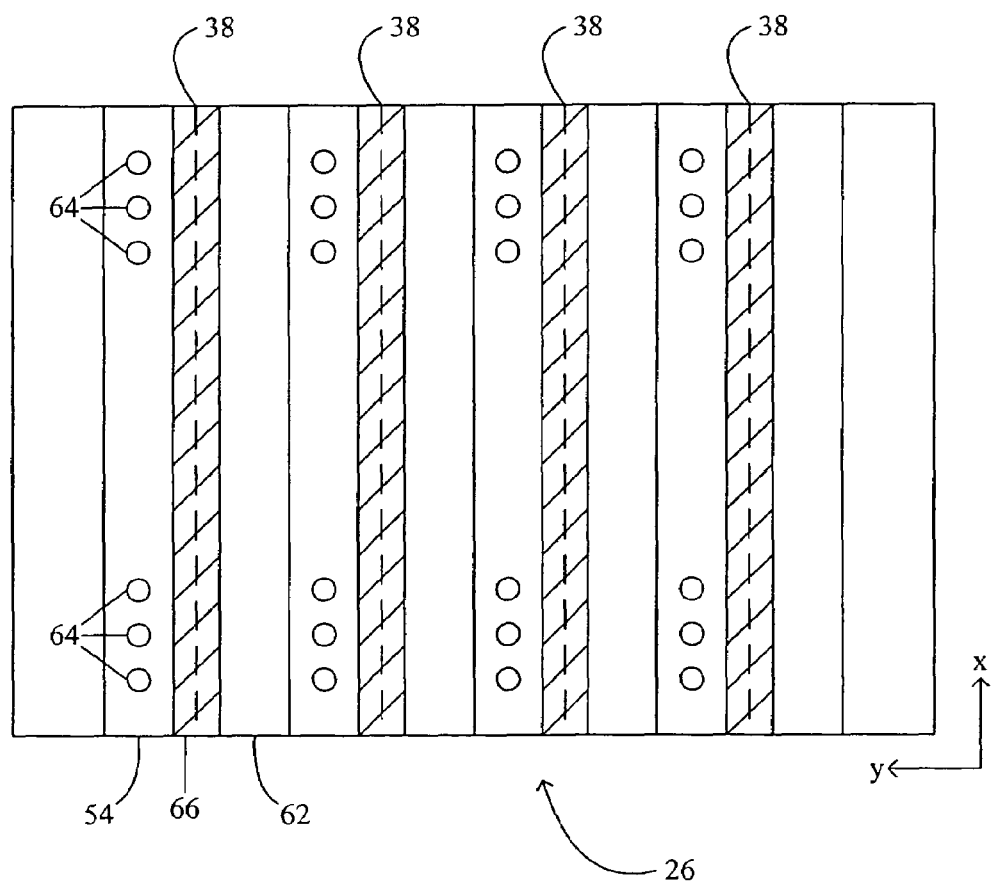
FIG. 4 is a top plan view taken along line 4-4 of FIG. 3.

As seen in FIG. 4, each of the channels 38 are provided with a number of contacts 64 and a grounding strip 66. The contacts 64 are electrically conducting and are located in walls 54 of the channels. The grounding strips 66 are also electrically conducting and are connected near to the bottom of the walls 62 of the channels. As will be discussed in greater detail subsequently, an interactor 34 makes electrical contact with one of the contacts 64 and with the grounding strip 66 when properly engaged with the V-shaped channel 38. The magnets 52 and 58, in addition to urging the interactor 34 into the channel 38, also help assure that the interactor 34 is aligned properly in the x direction so that it makes good contact with the intended contact 64. This desired result is accomplished because the magnets 52 and 58 will create a force that will attempt to align the interactor in the x direction. The contact 64 and the grounding strip 66 can be made, for example, from copper or any other suitable conductive material.

Figure 5:
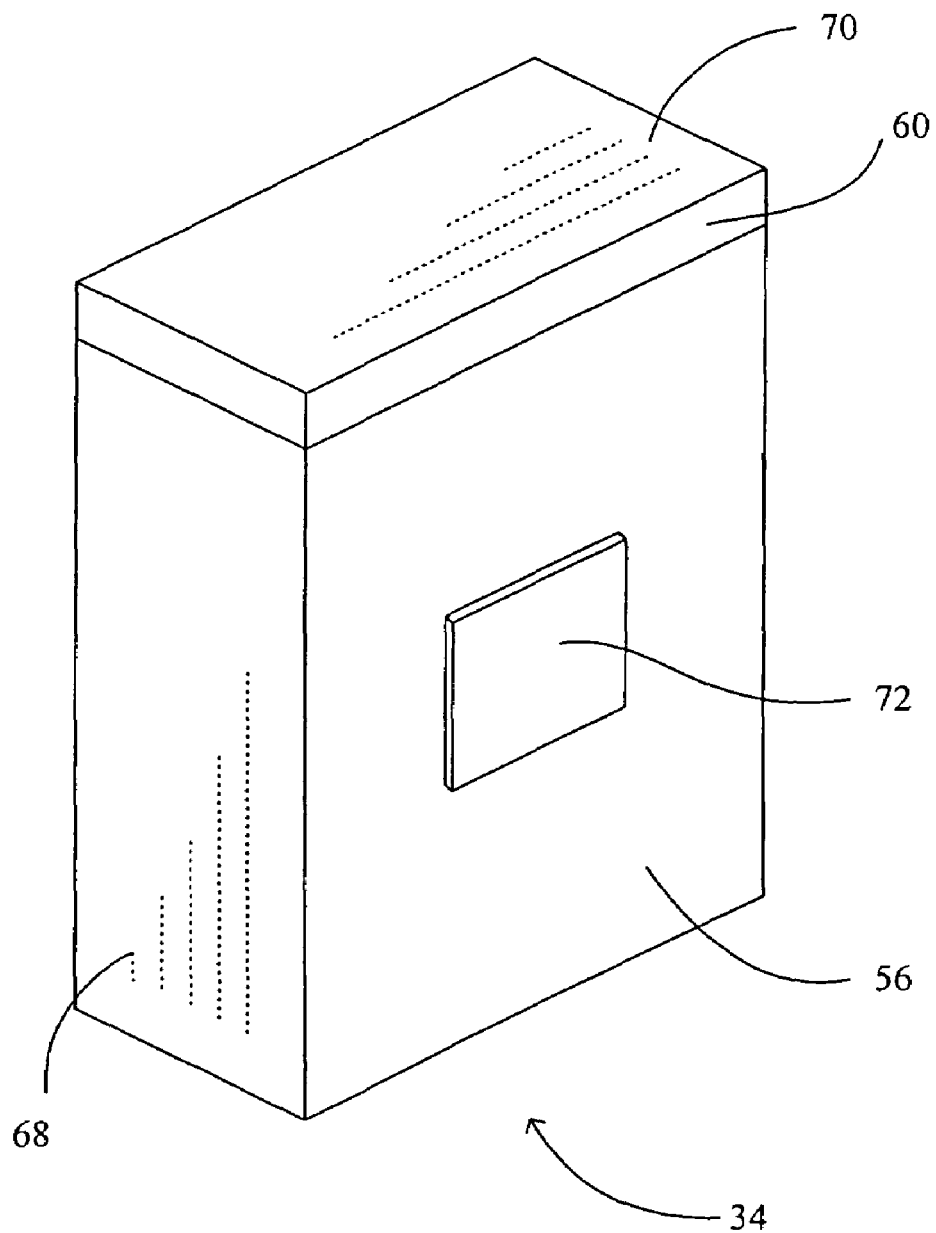
FIG. 5 is a perspective view of an interactor in accordance with the present invention.

In FIG. 5, a perspective view of an interactor 34 shows the base 60 and back 56. The body 68 of the interactor 34 of FIG. 5 is a rectangular prism and is made from a non-conductive material such as wood or plastic. Base 60 includes a foil member 70 which is adapted to engage the grounding strip 66 of the V-shaped channels 38. Attached to the back 56 is a contact 72 which is adapted to engage one of the contacts 64 of the V-shaped channels 38. The foil 70 and contact 72 are made from a suitable conductive material, such as copper.

The interactors 34 and the detection field 26 are sized for easy use and for the simultaneous use by several persons. For example, the interactors 34 can have dimensions of about 0.5 in.×1.5 in.×2.0 in., while the detection field can have dimensions of about 1 ft×2 ft.×3 in. in height. This permits the interactors 34 to be comfortably held in a user's hand, and allows multiple users to simultaneously interact with the detection field 26.

Figure 5A:
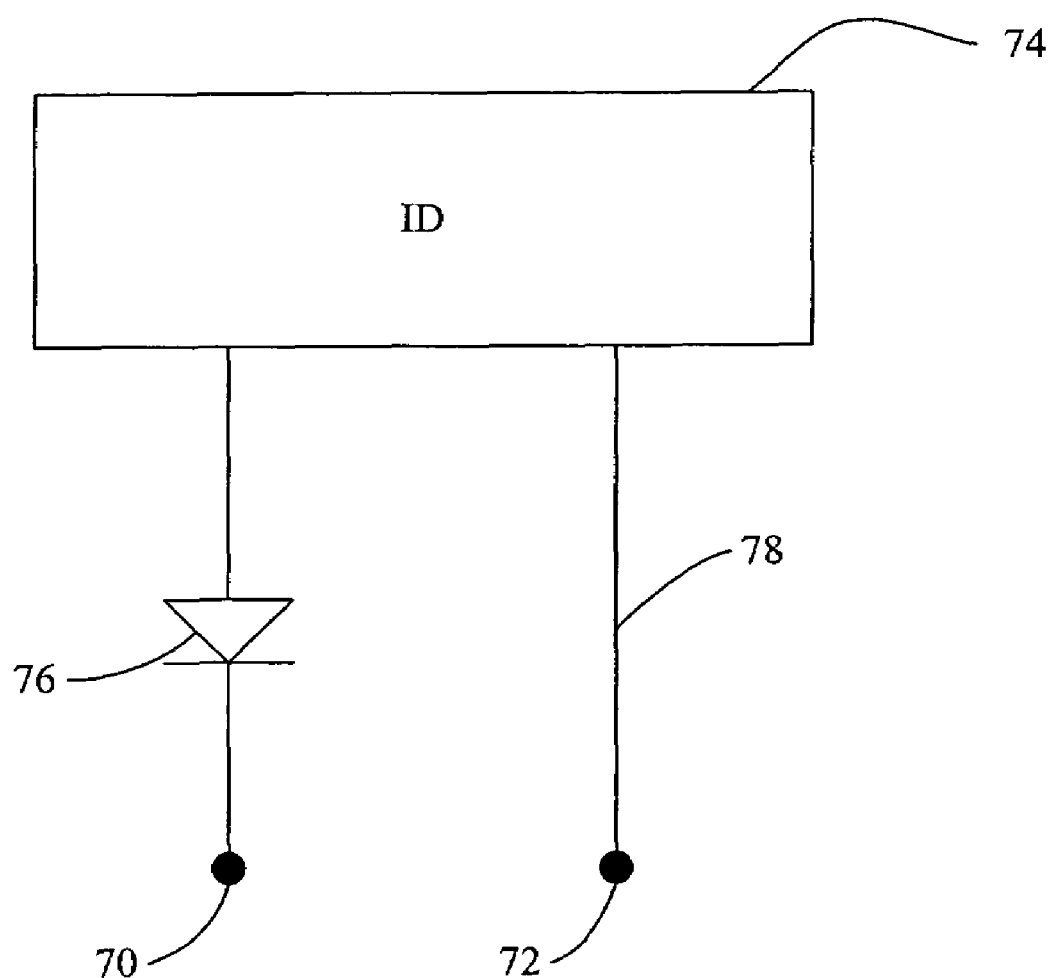
FIG. 5a is a schematic representation of the internal circuitry of the interactor of FIG. 5.

In FIG. 5a, the internal circuitry of the interactor 34 is shown. The circuitry includes an identification (ID. chip 74), and a diode 76. The ID chip is available from Dallas Semiconductor of Texas as part number DS2401, and provides a unique 48-bit identification (ID) when properly queried. The diode 76 prevents false keying, as is well known to those skilled in the art of keyboard design. The ID chip 74 is coupled to node 70 by the diode 76, and is coupled to the contact 72 by a line 78.

Figure 6:
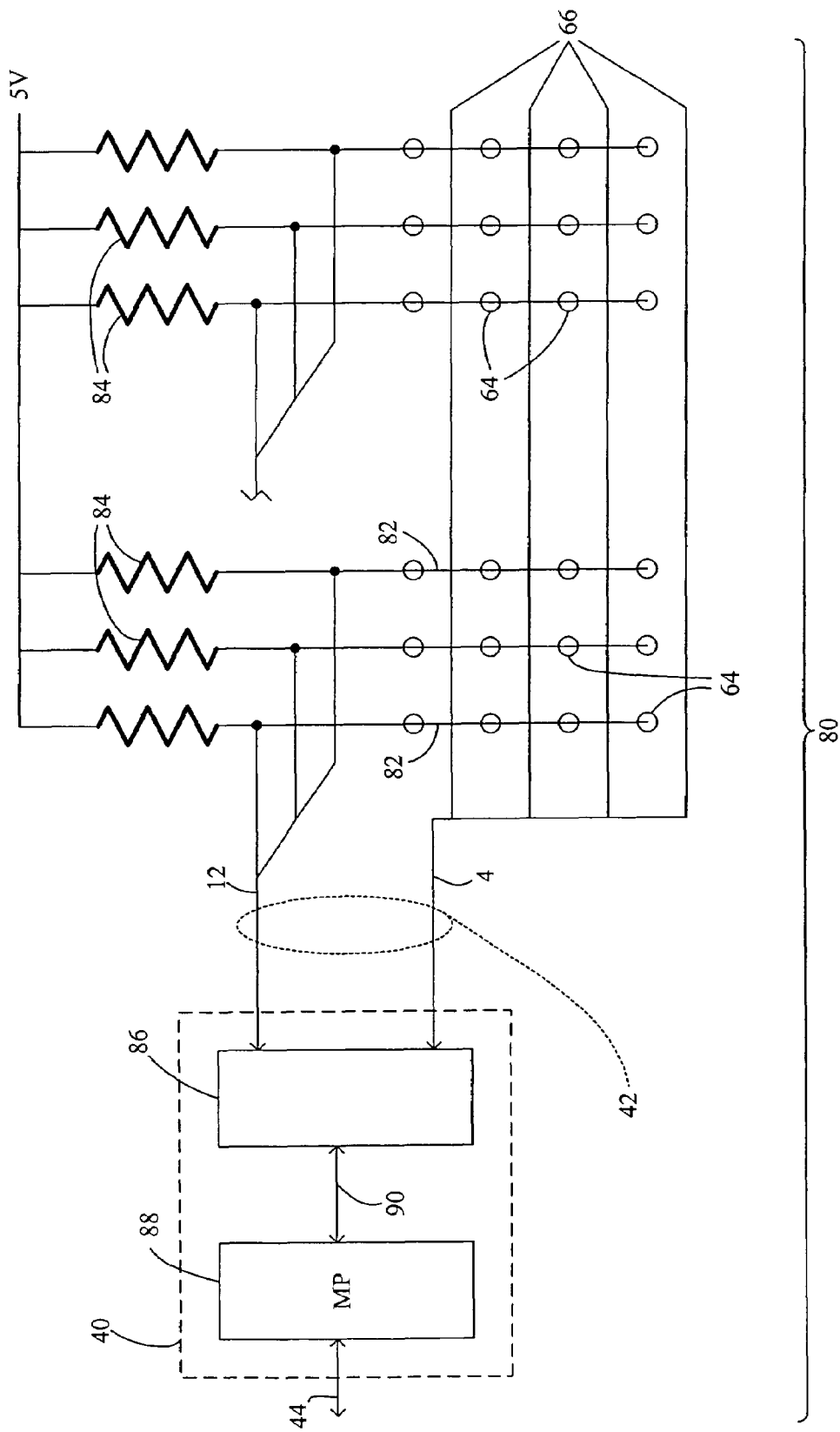
FIG. 6 is a schematic diagram of the circuitry of the detection field illustrated in FIGS. 3 and 4.

In FIG. 6, the internal circuitry 80 of the detection field 26 is illustrated. More particularly, the internal circuitry 80 includes the four grounding strips 66 and the contacts 64 described previously. The contacts 64 are coupled together in rows by lines 82 and are coupled to Vcc (e.g. 5 volts) by pull-up resistors 84. Nodes of the circuitry 80 between the pull-up resistors 84 and the contacts 64 form a 12 bit bus which are input into a buffer register 86. Likewise, grounding strips 66 are coupled into a four-bit bus and are input into the register 86. A microprocessor 88 (such as an M68H141 made by Motorola of Austin, Tex.) communicates with the register 86 via a bus 90. Collectively, the register 86 and the microprocessor 88 comprise the interface 40, and the 12 bit bus and the 4 bit bus collectively forms the bus 42. The output bus 44 is under the control of microprocessor 88. It will be appreciated by those skilled in the art that the interface 40 will also include other well-known components, such as RAM for scratch-pad storage, ROM to store the control instructions for the microprocessor 88, etc.

Figure 7:
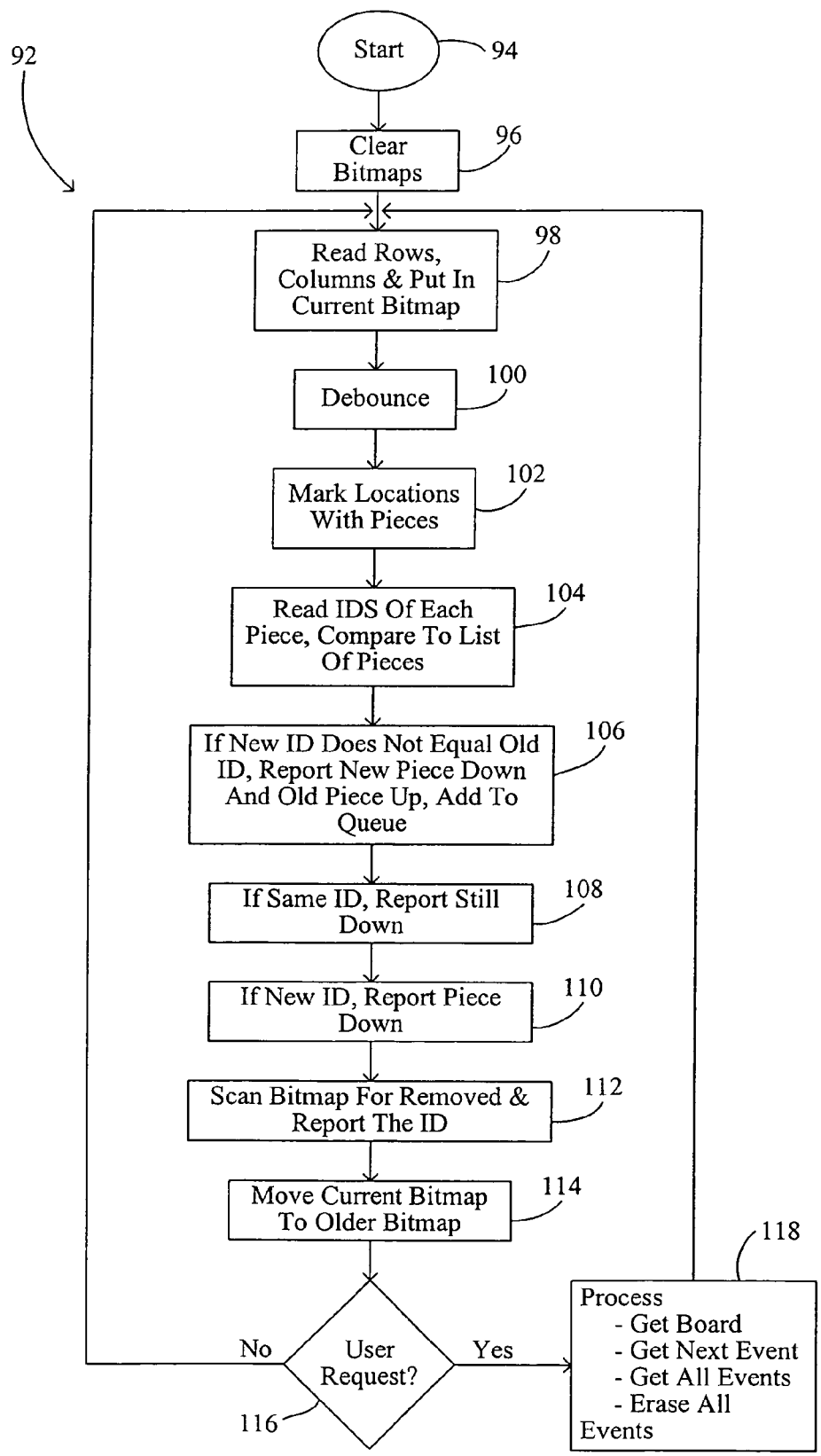
FIG. 7 is a flow diagram of a computer implemented process running on the microprocessor of FIG. 6.

In FIG. 7, a computer implemented process 92 that runs on the microprocessor 88 to control the circuitry 80 will be described. The instructions for this process 92 are stored in the aforementioned ROM of the interface 40, as will be appreciated by those skilled in the art. The process 92 begins at 94 and, in a first step 96, the microprocessor 88 clears the bit maps. By bit map, it is meant binary digits are mapped to particular locations on the board. These bit maps are preferably stored in the aforementioned RAM memory of the interface 40. Next, in a step 98, the rows and columns of the circuitry 80 are read and put into the current bit map. Next, in a step 100, a debounce routine is performed. Debounce routines are well known to those skilled in the art of keyboard and computer switch design. Next, in a step 102, locations on the detection field 26 that have "pieces" are "marked" on the bit map. As used herein, a "piece" is an interactor. By "marking" a location, a piece is engaged with the detection field 26 such that it makes electrical contact with the circuitry 80. Next, in a step 104, the ID of each of the pieces engaged with the detection field 26 is read, and is then compared to a list of the pieces (also stored in RAM memory of the interface 40). In a step 106, if a newly read ID is not equal to an old ID for a particular position, then a report is made that a new piece has been put down (i.e. engaged with the detection field 26) and an old piece has been picked up from the same position. This information is added to a queue stored in RAM. In a step 108, if the same piece is in the same position on the detection field, it is reported that the piece is still down. In a step 110, if a new piece is detected at a position, it is reported that a piece has been placed on to the detection field 26. Next, the bit map is scanned in a step 112 for removed pieces and, if a removed piece is detected, the ID is reported. Next, in a step 114, the current bit map is moved into the older bit map. Subsequently, a step 116 determines if there is a user request. If not, process control is returned to step 98. If there is a user request, that user request is handled in a step 118. In the current preferred embodiment, this involves processing the user request to handle the commands "get board state", "get next event", "get all events", "erase all events", and "get board type (version)." After the user request has been processed, process control is again returned to step 98.

Figure 8A:
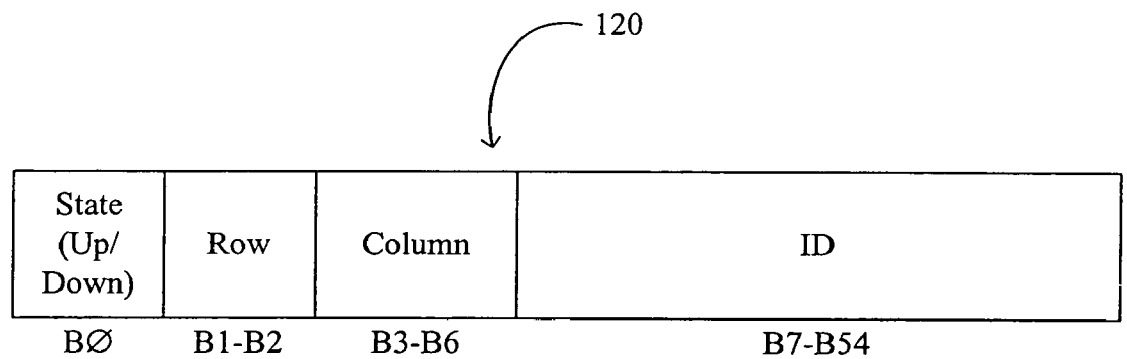
FIG. 8a is a data word produced by the process of FIG. 7.

In FIG. 8a, a digital word 120 of the present invention includes a number of bits. More particularly, the current word includes 55 bits. Of the bits, a bit B0 indicates the state, bits B1-B2 indicate the row, and bits B3-B6 indicates the column of the interactor. Finally, bits B7-54 hold the 48 bit ID of the interactor. This data can be passed to the computer 28 via bus 44.

In FIG. 8b, a table of state changes is shown along with their associated meanings. As described previously, the word 120 includes a state which is essentially exit/enter (up/down) for a particular interactor (i.e. when and how long has an interactor been positioned in the detection field). If the current state value is equal to 0, and the last state value is equal to 0, the meaning is that there is no piece (interactor) at that row and column position. If the current state is 1 and the last state is 0, that means that a piece has been put down at that row and column position. If the current state is 1 and the last state is 1, that means that the piece is still down since that last time that the detection field was scanned. Finally, if the current state is 0 and the last state is 1, that means that a piece has been picked up, i.e. an interactor has been removed from the detection field.

Figure 9A:
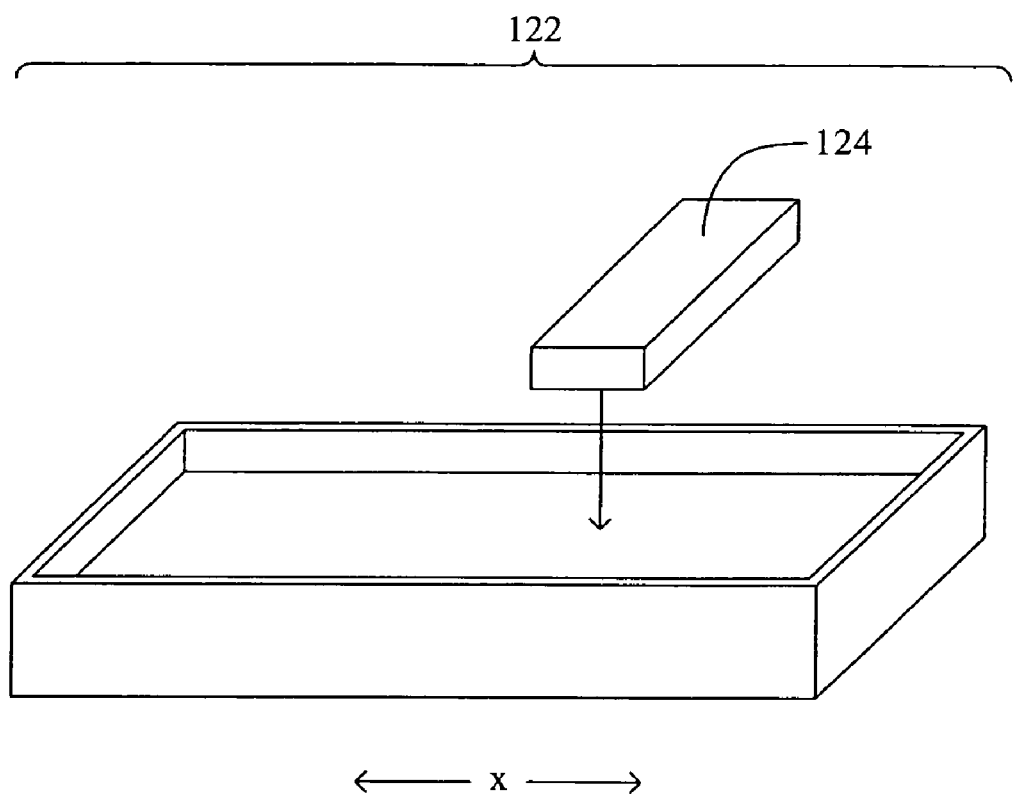
FIG. 9a illustrates a one-dimensional detection field.
Figure 9B:
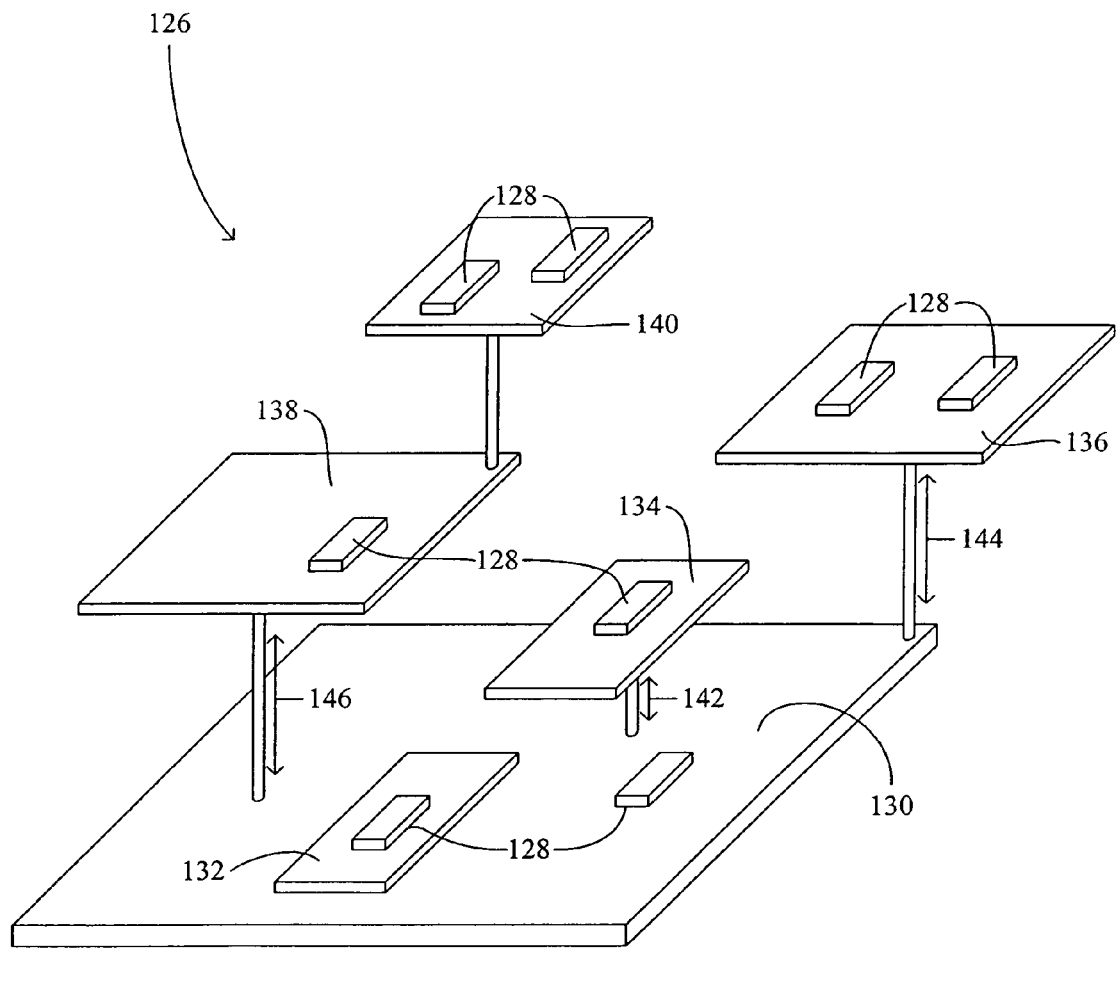
FIG. 9b illustrates both a three-dimensional and a four-dimensional detection field.
Figure 9C:
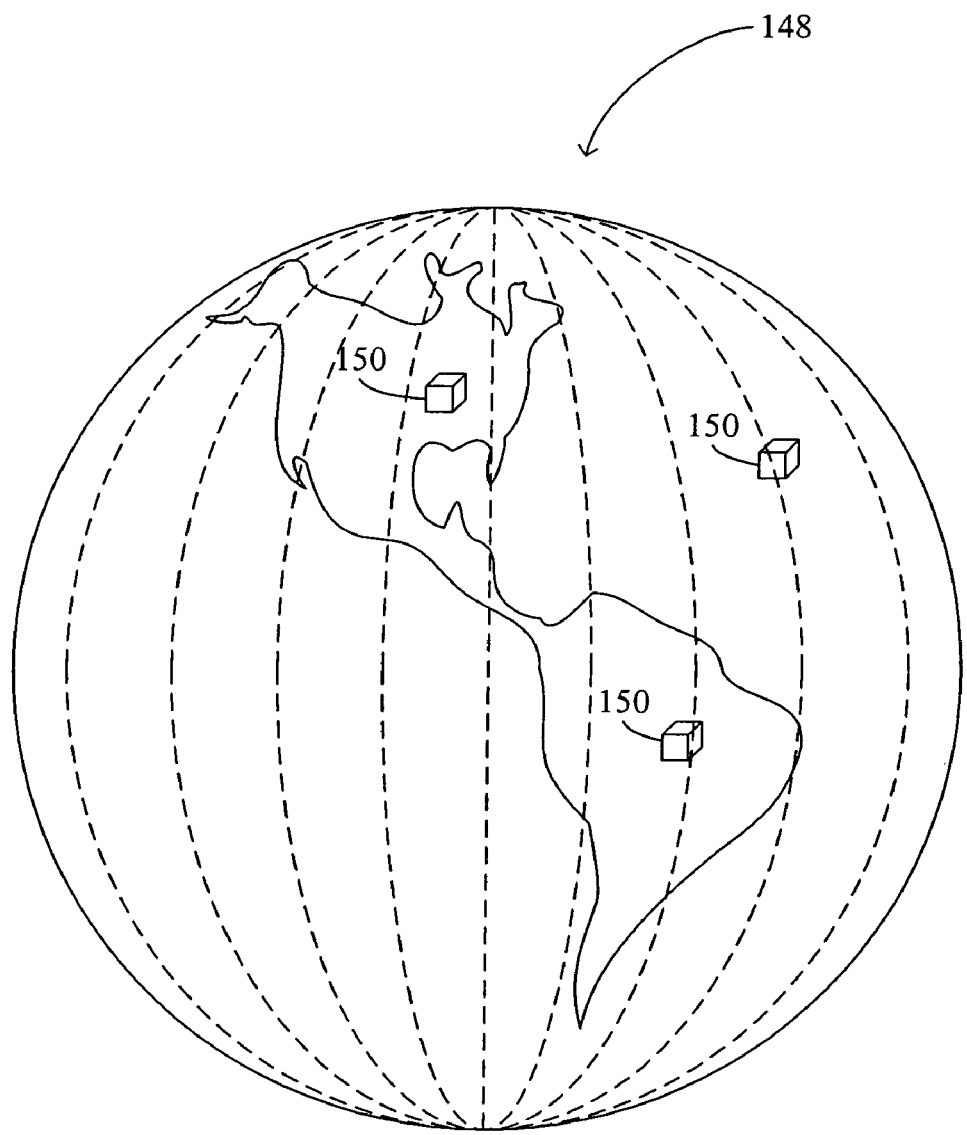
FIG. 9c illustrates an alternative three-dimensional detection field.

FIGS. 9a, 9b, and 9c illustrate three alternative embodiments for a detection field. In FIG. 9a, a detection field 122 allows an interactor 124 to be linearly placed in a multiplicity of positions along an x axis. This is an illustration of a one-dimensional detection field. It should be noted that, at the trivial extreme, if the detection field 122 is shortened sufficiently, it can be made just large enough to accept a single interactor 124. This would comprise a zero-dimensional detection field which would simply detect the presence or absence of an interactor and its ID number, i.e. it can operate as a simple switch.

In FIG. 9b, a detection space 126 is illustrated that can accept interactors 128 in three dimensions, i.e. along x, y, and z axes. The x, y, and z positions of an interactor 128 can all be used to determine the context or meaning of the interactor. For example, the base platform 130 can have a different meaning from a first platform 132, a second platform 134, a third platform 136, a fourth platform 138, and a fifth platform 140. Platform 136 could, for example, be dedicated to changing the identity of one of the interactors 128. Objects on platform 138 could be "enclosing" interactors on platform 140. The meaning and relationships of the various platforms can therefore be designed based upon desired functionalities specified by a user.

It should also be noted that a fourth dimension can be added to the detection space 126 of FIG. 9b. In other words, the detection field 126 can change with time. One way to accomplish this is to allow the platforms to move over time such that their meanings change. For example, as indicated by arrows 142, 144, and 146, platforms 134, 136, and 138 can be allowed to move up and down, respectively, perhaps under the control of a motor (not shown). This permits an interactor 128 to have different meanings over a period of time. For example, the interactor 128 on platform 134 could represent a volume level for a loudspeaker which will diminish over time as the platform moves downwardly in a z direction. Therefore, it should be clear from the foregoing that the detection spaces or fields can be n-dimensional where n is 0, 1, 2, 3, etc.

In the previous examples of detection fields and spaces, the detection fields and spaces have always been mapped by Cartesian (x, y, z) coordinates. In FIG. 9c, a detection space 148 in the form of a spherical globe is provided where a number of interactors have been adhered (such as by magnets) to its surface. With such spherical detection spaces or fields, it may be more convenient to determine the position of the interactors using a spherical coordinate system. It should also be noted that other forms of detection fields can be provided including detection fields of irregular shapes.

The present invention will be described more particularly in the form of the following two examples. It will be appreciated, however, that there are many other applications in which the interactor methods and systems can be used with good effect.

EXAMPLE 1

An Audio Control System

Figure 10:
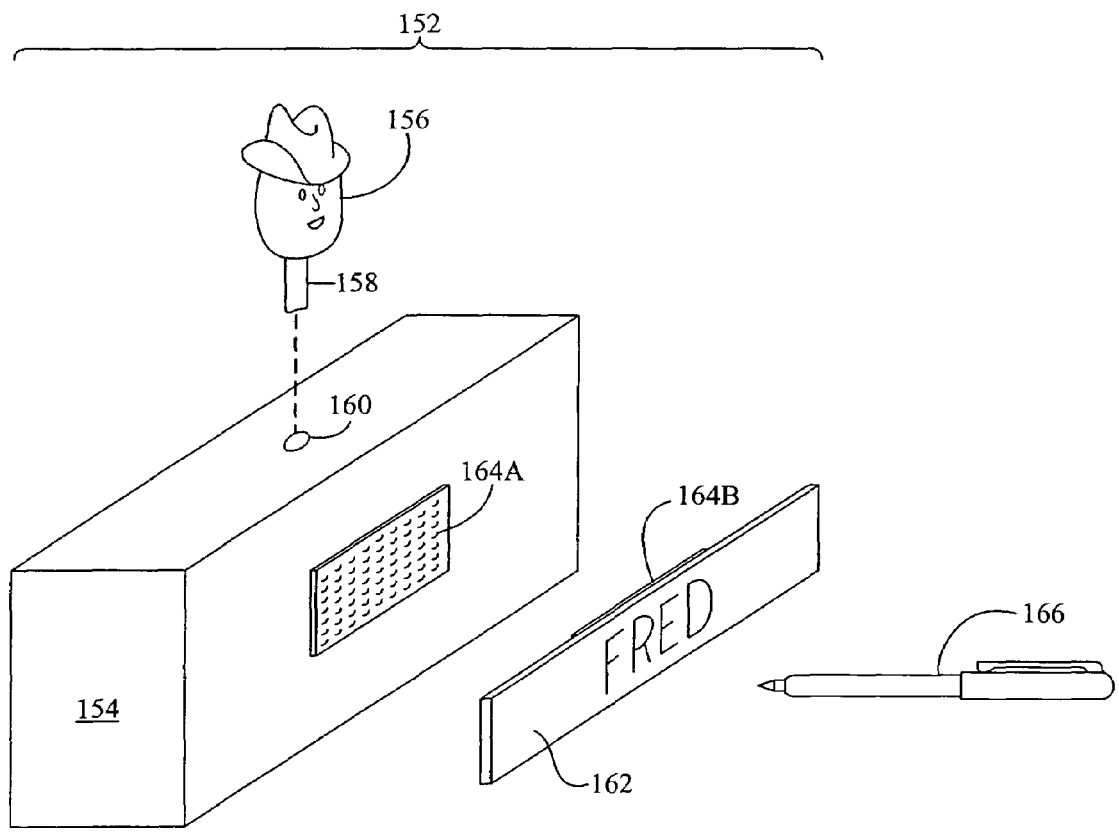
FIG. 10 illustrates an interactor used to control an audio system.

In FIG. 10, an interactor 152 is shown which will be used for a particular implementation of the present invention. The interactor 152 includes a body 154 that operates functionally in a fashion very similar to that of the interactor 34 illustrated in FIGS. 5 and 5a. The interactor 152 can be used with a detection field similar to or identical with detection field 26 as illustrated in FIGS. 3, 4, and 6. The detection field 26 used with the interactor 152 can also use the same interface 40 to interconnect the field with a computer system 28.

The difference between interactor 152 and the previously described interactor 34 is therefore design related and not computational in nature in that they support different metaphors. With the interactor 152, a doll's head 156 or other talisman is provided with a peg 158 which can engage a hole 160 in the body 154. A small piece of white board 162 is removably attached to the body 154 by a pair of hook-and-pile (e.g. Velcro®) members 164a and 164b. The hook-and-pile member 164a is attached to a surface of body 154 while member 164b is attached to the back of the white board 162. In this way, the white board 162 can be removably attached to the body 154 of the interactor 152. A name, label, or other indicia can be provided on the white board 162 with a marker 166 as illustrated by the name "Fred." Therefore, the interactor 152 can be used to represent a person named Fred both by means of the head configuration 156 and the name on the white board 162. It is a useful feature of the present invention in that interactors can be given distinct visual, aural or other sensory identities which aid in the metaphor of the human-computer interface.

Figure 11A:
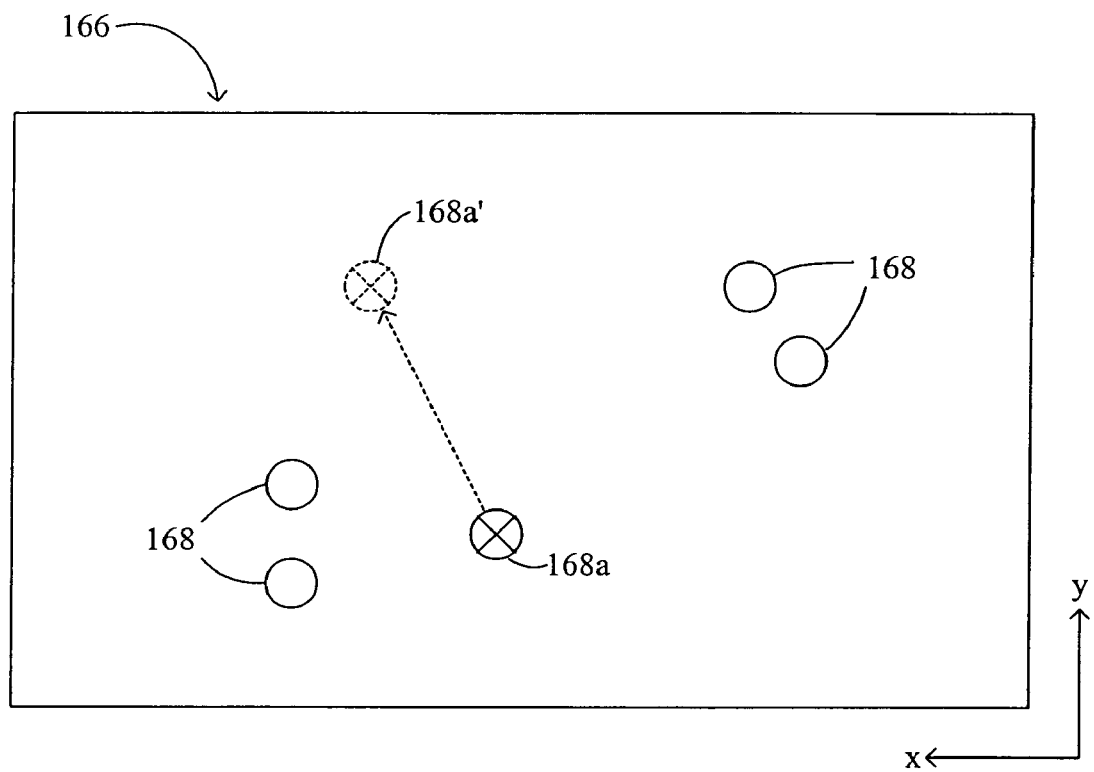
FIG. 11a illustrates a first embodiment of the audio control system wherein the user is embodied into the system.

In FIG. 11a, a detection field 166 has a number of interactors 168 that can be positioned at various locations. In this instance, one of the interactors 168a represents the user herself. The other interactors 168 in this example represent other people. As noted, the pieces can be moved around such that their relative x, y positions change with respect to each other. It is therefore possible with the interactors of the present invention to create a "virtual room" wherein the utterances made by various persons represented by the interactors appear to be spatially located as indicated by the interactors. Therefore, the interactors and detection fields of the present invention can be used as a controller for forming groups in a "virtual room" and for varying the relative location of the various members of the group.

For example, in FIG. 11a, before the user's interactor has been moved, two people would appear to be talking to the left of the user and two people would appear to be talking in front of and to the right of the user. After the interactor 168a has been moved to the new position 168a', the two people that were apparently to the left of the user would now be behind the user, and the two people that were to the front and right of the user would be directly to the right of the user. By removing any one of the interactors 168 from the "virtual room," that person would no longer be part of the conversation, and removing the user's interactor 168a from the room (i.e. removing the interactor from the detection field 166) would eliminate the "virtual room." Of course, a suitable number of loudspeakers would be required to create the desired illusion.

Figure 11B:
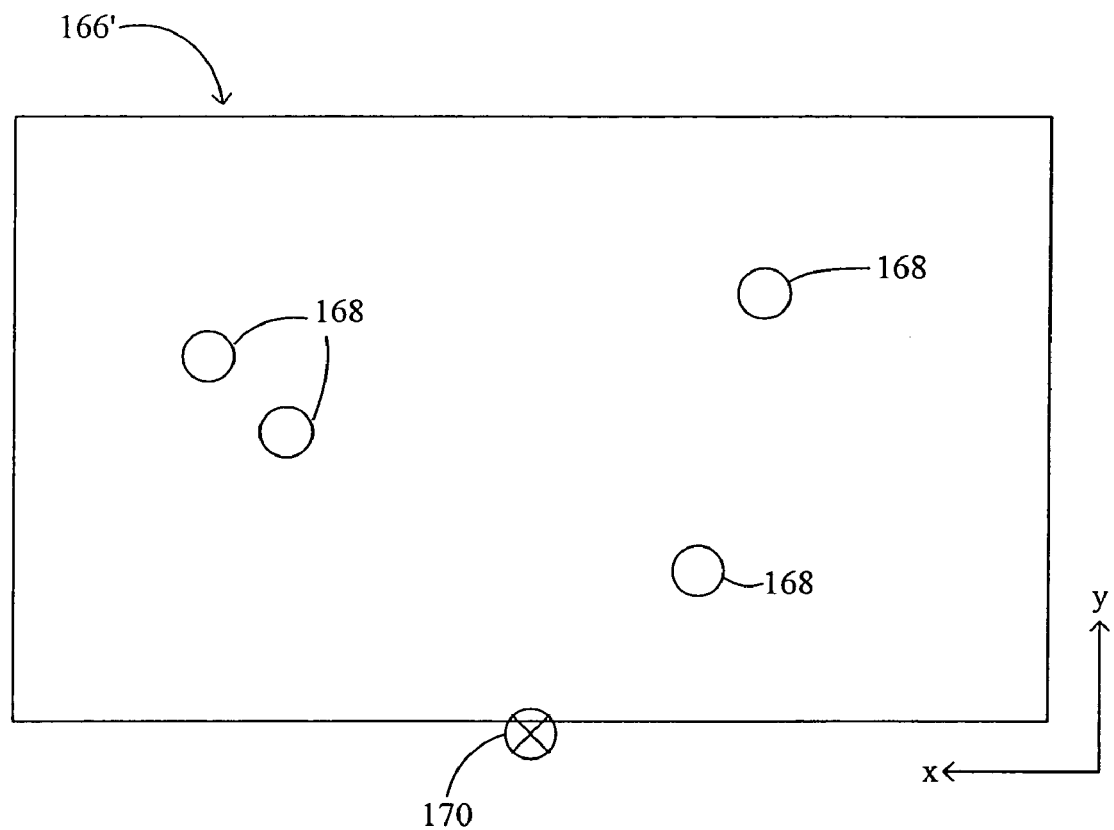
FIG. 11b illustrates a second embodiment of the audio control system wherein the user is not embodied into the system, i.e. is omniscient to the system.

In FIG. 11b, a slightly altered detection field 166' is used for substantially the same purpose as previously described. However, in the previous embodiment, an interactor representing the user herself is within the detection field 166, but in the embodiment of FIG. 11b, the user does not have an interactor representing herself on the detection field 166'. In the previous embodiment as illustrated in FIG. 11a, the user is said to be "embodied" in that she is on the detection field and can move on the detection field relative to other interactors. However, in the "non-embodied" or "omniscient" version shown in FIG. 11b, the position of the user is fixed at some point, either off or on the detection field 166'. For example, the user might be positioned at a point 170 just off of the detection field 166'. However, the other people represented by interactors 168 can be adjusted relative to the user to obtain much of the effect obtainable by the embodiment illustrated in FIG. 11a.

Figure 11C:
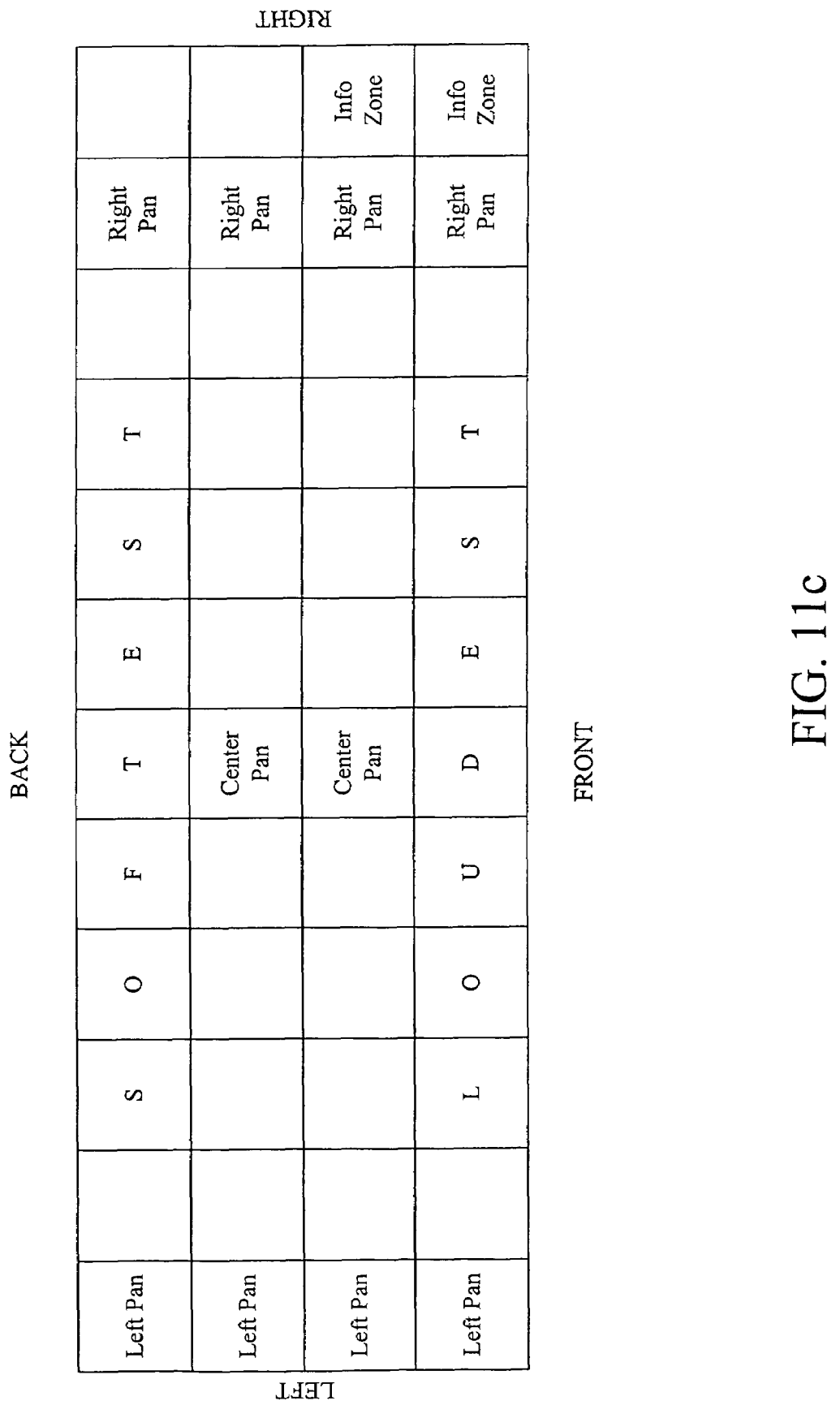
FIG. 11c illustrates a layout of a two-dimensional detection field used for the audio control device.

In FIG. 11c, a potential "layout" of a detection field 166 is illustrated. If an interactor is placed near the back of the field, the volume associated with the person represented by that interactor is at its softest. Placing the interactor near the front of the field will make the associated person the loudest. Special positions on the left and right edges and down the center of the detection field can perform special functions, such as "pan", "get info", or "assign."

Figure 12:
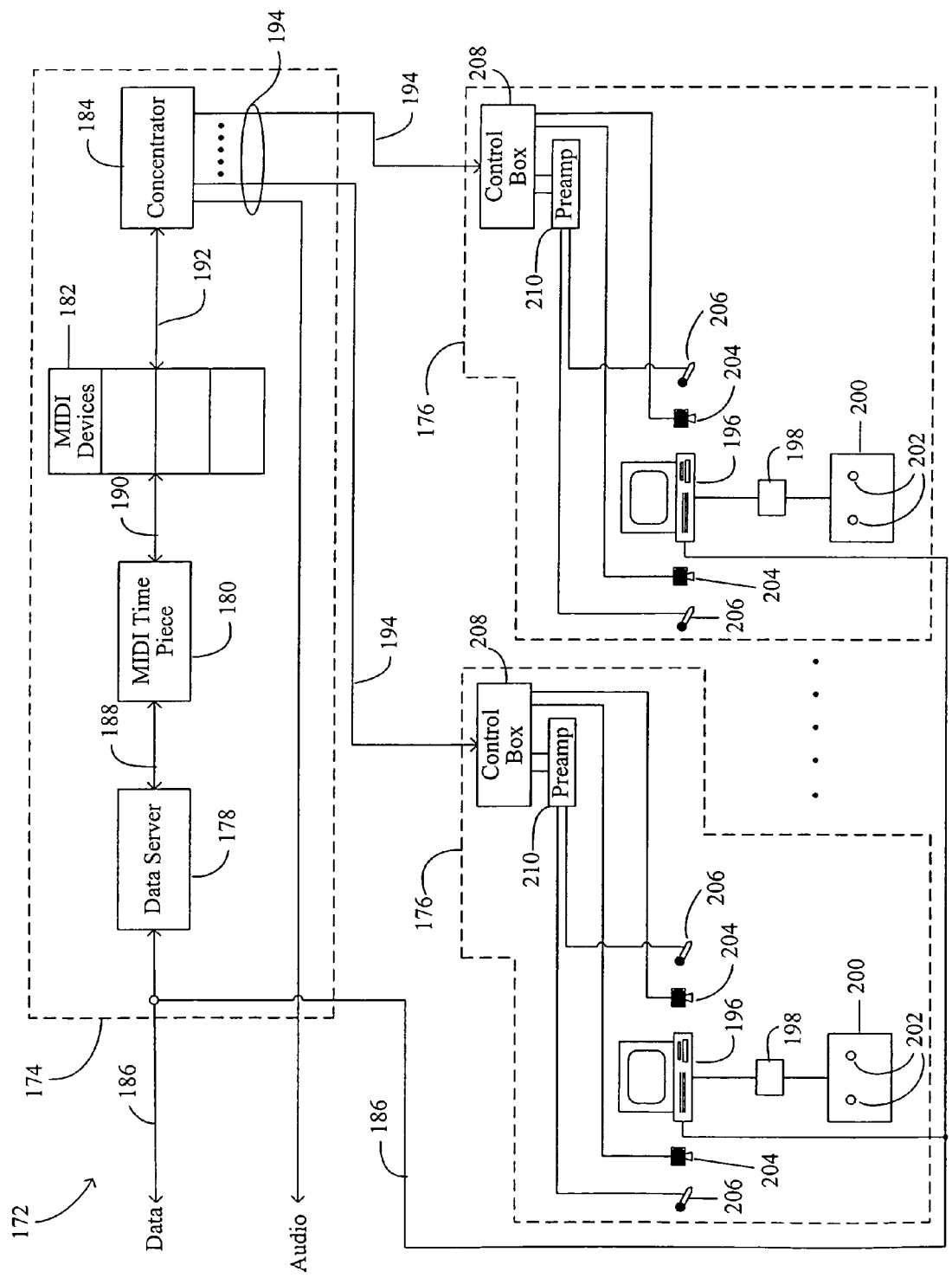
FIG. 12 is a block diagram for an audio control system of the present invention.

In FIG. 12, an interactor system 172 in accordance with the present invention includes an audio server 174 and a number of workstations 176. As a system, the interactor system 172 can perform the functionality described with respects to FIGS. 11a and 11b.

The audio server 174 includes a data server 178, a MIDI timepiece 180, a number of MIDI devices 182, and an audio concentrator 184. The data server 178 receives data from a network bus 186 and is connected to the MIDI timepiece 180 by a bus 188. The MIDI timepiece 180 is connected to a rack of MIDI devices 182 by a bus 190, and the output of the MIDI devices 182 are coupled to the concentrator 184 by a bus 192. The concentrator 184 has, as inputs, a number of audio lines 194.

Each workstation 176 includes a computer 196, interfaces 198, and detection fields 200 as described previously. The detection fields 200 can have one or more interactors 202 placed upon their surfaces as previously illustrated and described with reference to FIGS. 11a and 11b. The workstation further includes a pair of stereo loudspeakers 204 and a pair of stereo microphones 206. The loudspeakers 204 are coupled directly into a control box 208 which include loudspeaker amplifiers. The microphones are coupled to a preamplifier 210 which, in turn, are coupled to the control box 208. The control box 208 also includes microphone amplifiers. The audio lines 194 carry the microphone signals to the concentrator 184, and the loudspeaker signals from the concentrator 184 to the various speakers 204.

Figure 13:
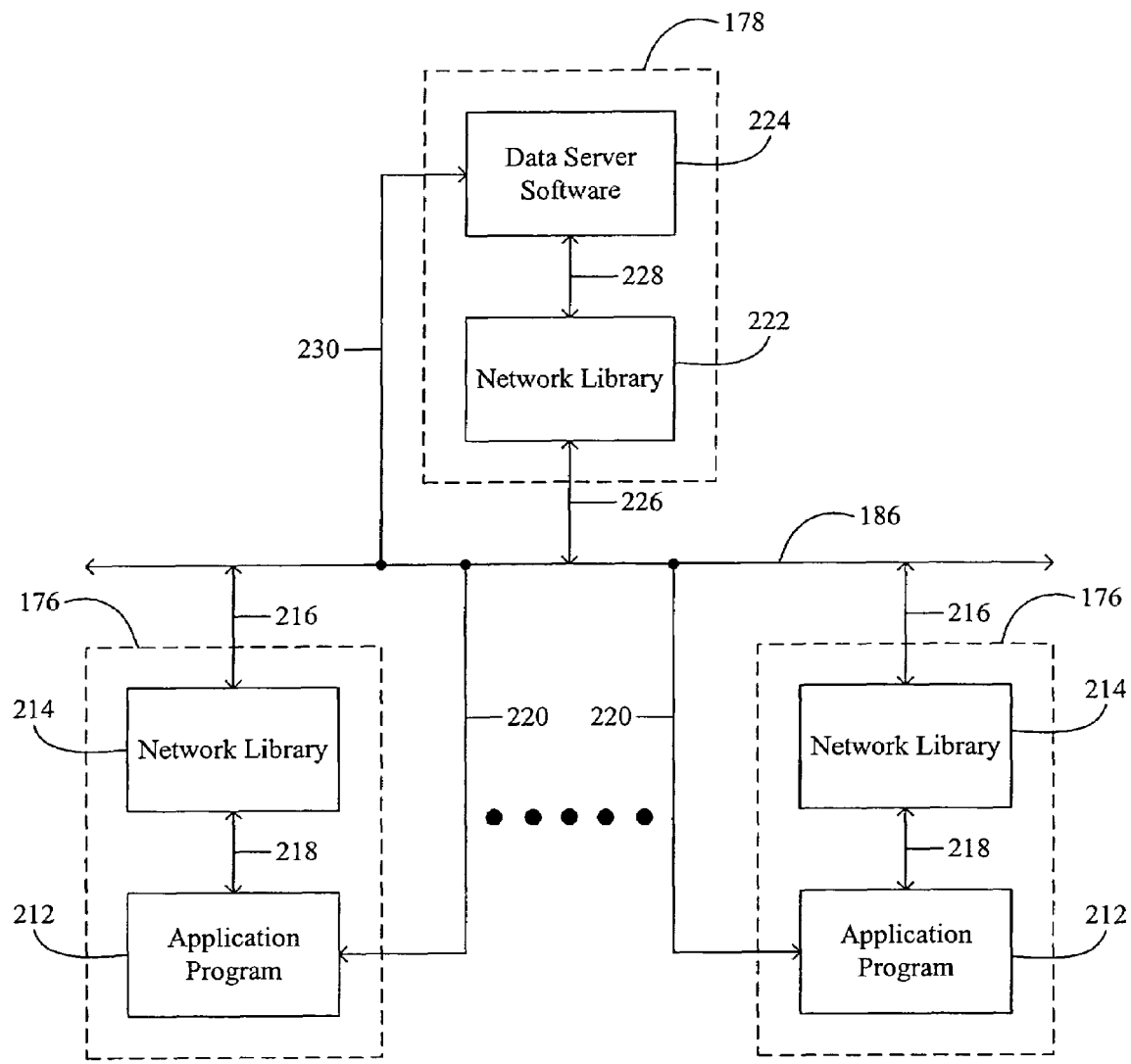
FIG. 13 is a block diagram representing the computer implemented processes running on the computers and server of FIG. 12.

The software operating the interactor system 172 is conceptually illustrated in block diagram form in FIG. 13. The databus 186 carries the data necessary to interconnect the various components of the system 172 and can, for example, be implemented on an Apple LocalTalk or Ethernet network protocol. It should be understood, however, that other network protocols such as Novell Netware or custom network software can also be used to provide the networking functions of the network bus 186.

Three software routines are used to implement the interactor system 172 of the present invention. Namely, each of the workstations 176 operate an application program and a network library, and a data server 178 operates data server software and the network library. The application program 212 runs on the computer 196 of each of the workstations 176 that are part of the interactor system 172. Network libraries 214 likewise each run on a computer system 196. The network library communicates with the network bus 186 via a conceptual link 216 and with the application program via a conceptual link 218. The application program 212 communicates with the network bus 186 via a conceptual link 220. The links 216, 218, and 220 are considered conceptual in that they are not physical links to the bus but, rather, logical links through operating system software, network software, internal buses, network cards, etc.

The software running on the data server 178 includes the network library 222 and the data server software 224. The network library has a conceptual link 226 to the network bus and a conceptual link 228 to the data server software 224. The data server software has a conceptual link 230 to the network bus 186.

In the present implementation, the conceptual links 220 and 230 from the network bus 186 to the application programs 212 and to data server software 224, respectively are AppleEvents created by an Apple networking system. The conceptual links 216 and 226 between the network library and the network bus 186 are preferably standard AppleTalk or Ethernet data packages.

Figure 14:
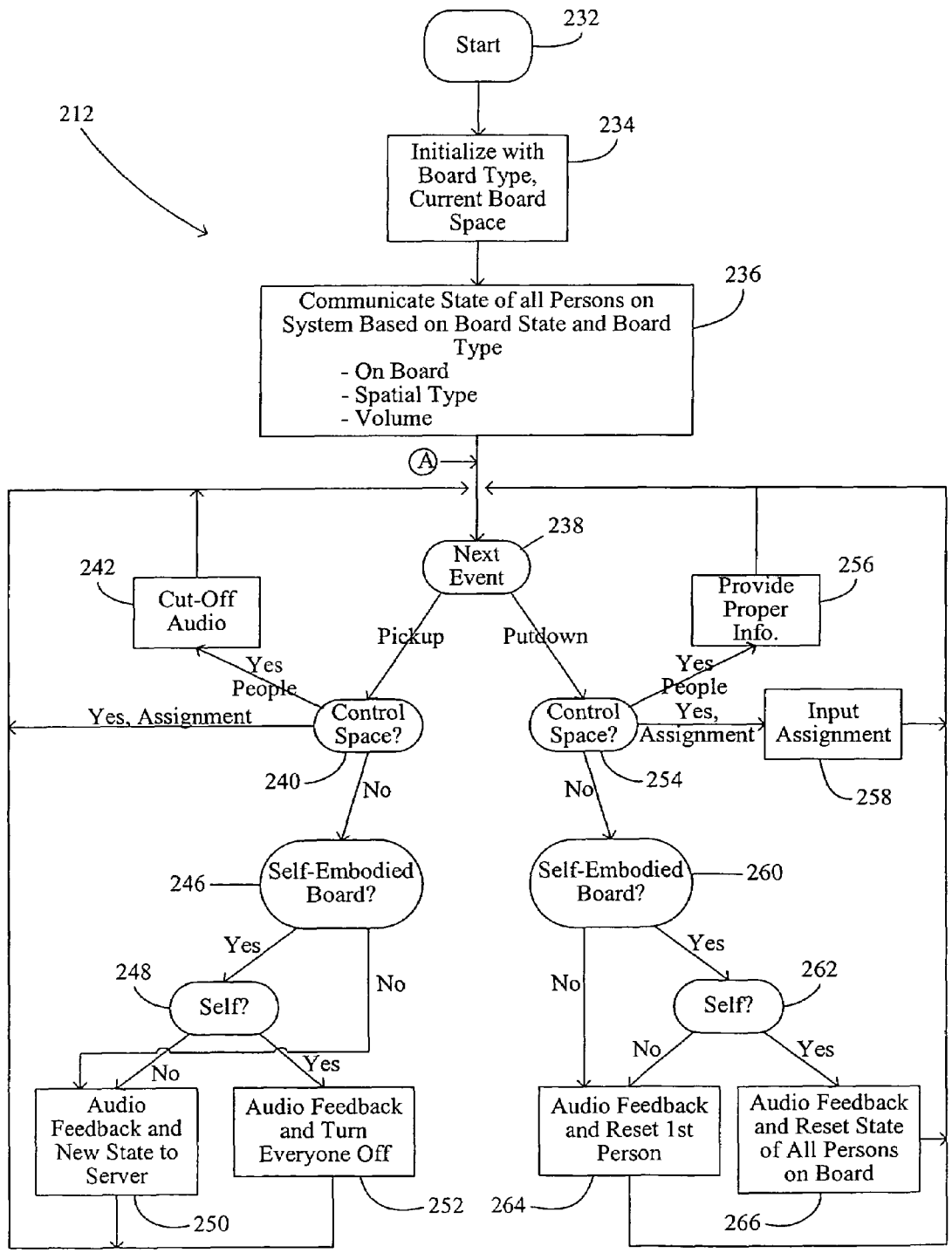
FIG. 14 is a flow diagram illustrating the operation of the application program of FIG. 13.

FIG. 14 illustrates the application program 212 running on the workstations 176. The process 212 begins at 232 and, in a step 234, the process is initialized with the board type, and the current board space. Next, in a step 236, the state of all persons on the system is communicated based upon the board state and board type. After the initialization and communication steps, the process enters an event queue 238 to await the next event. If the next event is a "pick-up" event, a step 240 determines whether the interactor is in a control space. As used herein, a control space is a dedicated portion of a detection field used to control the process. If it is an assignment control space (where meanings are assigned to interactors) control is returned to the step 238. If the control space is a people control space, the audio is cut off in a step 242 and process control is again returned to step 238.

If step 240 determines that the interactor is not in a control space, it is determined in step 246 if the board (i.e. the detection field) is self-embodied. If yes, it is determined in a step 248 if the interactor representing the user ("self") has been removed from the board. If not, the system provides an audio feedback and a new state to the server in a step 250. If the interactor representing the user has been removed from a self-embodied board, a step 252 provides audio feedback and turns off the sound to all users.

If the event queue detects an interactor being put down on the detection field, a step 254 determines whether it was put down into a control space. If yes, people information is provided in a step 256. If it was put into an assignment space, a step 258 inputs the assignment to the interactor. After either step 256 or 258 are completed, process control is returned to step 238. Next, in a step 260, it is determined whether there is a self-embodied board. If yes, a step 268 determines whether an interactor representing the user has been placed on the detection field. If not, or if step 260 determines that is not a self-embodied board, a step 264 provides audio feedback and resets the data concerning the person represented by the interactor. Otherwise, step 268 determines an interactor representing the user has been placed on the detection field, audio feedback is provided, and a reset of all of the people represented by the interactors on the board is initiated. After steps 264 or 266 is completed, process control is returned to step 238.

Figure 15:
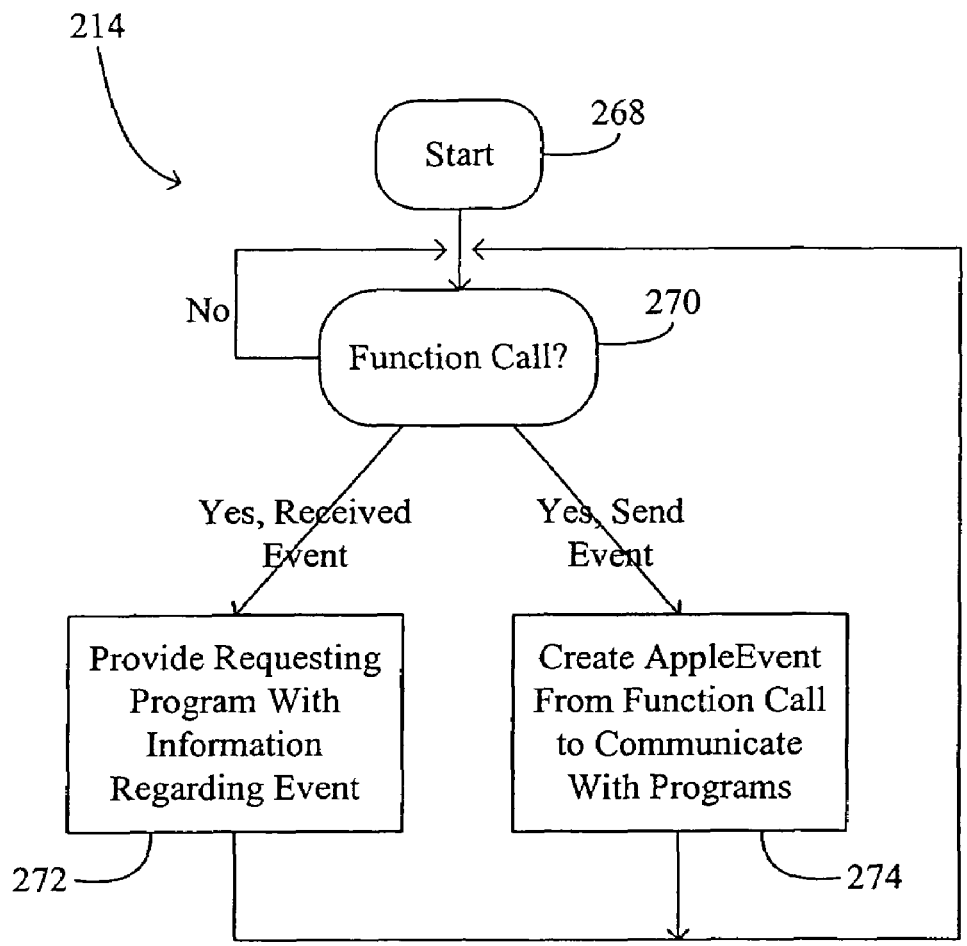
FIG. 15 is a flow diagram illustrating the operation of the network library of FIG. 13.

In FIG. 15, the functionality of the network library 214 of FIG. 13 is shown in greater detail. The functionality of network library 222 is substantially the same. The process 214 begins at 268 and, in a step 270, it is determined whether a function call has been received. If not, the process 214 goes into an idle loop awaiting a function call. If a function call "receive event" has been received, a step 272 provides a requesting program with the information regarding the event. If a functional call corresponding to "send event" is received, an AppleEvent is created from the function call to communicate with other programs in a step 274. Process control is returned to the function call event loop 270 after the completion of either steps 272 or 274.

Figure 16:
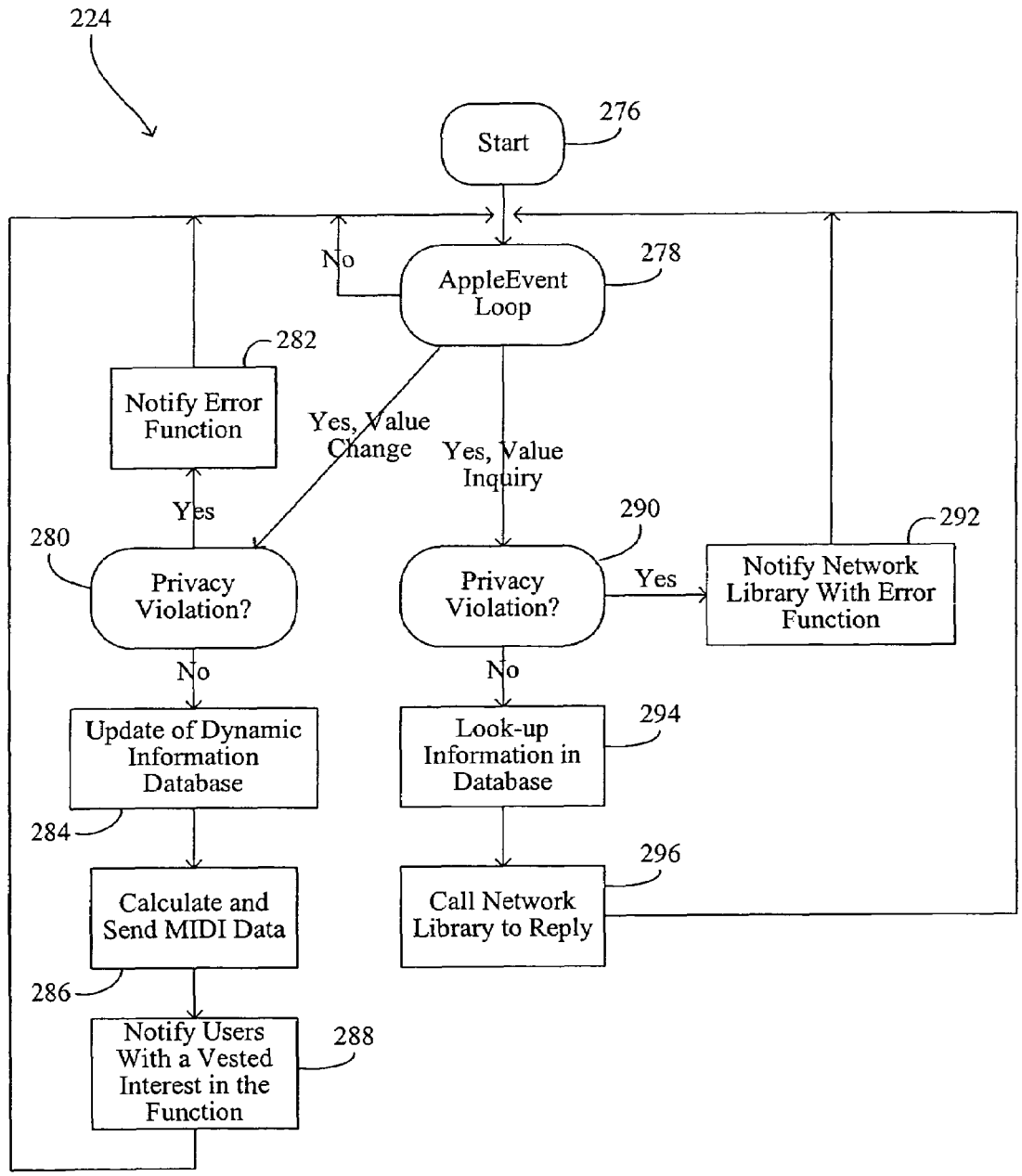
FIG. 16 is a flow diagram illustrating the server software operation of FIG. 13.

In FIG. 16, the operation of data software server 224 of FIG. 13 is illustrated in greater detail. A process 224 begins at 276 and, in a step 278, it is determined whether an AppleEvent has been received. Again, this process 224 is Macintosh® specific, and like or equivalent processes can be used in other types of computer systems. If an AppleEvent has not been received, the AppleEvent loop 278 repeats until that AppleEvent is received. If the AppleEvent is a "value change" AppleEvent, a step 280 determines whether there is a privacy violation. If yes, a step 282 notifies an error handler to handle the privacy violation. Process control is then returned to step 278. If there is not privacy violation detected by step 280, there is an update of dynamic information database in a step 284. Next, in a step 286, MIDI data is calculated and sent. In a subsequent step 288, users with a vested interest in the function are notified, and process control is returned to step 278. If a "value inquiry" AppleEvent is detected, a step 290 determines whether there is a privacy violation. If yes, a step 292 notifies the network library with the error function and process control is returned to step 278. If there is not a privacy violation as determined by step 290, information is retrieved from the database in a step 294. Finally, in a step 296, the network library is called to reply and process control is returned to step 278.

EXAMPLE 2

Videotape Marking System

Figure 17:
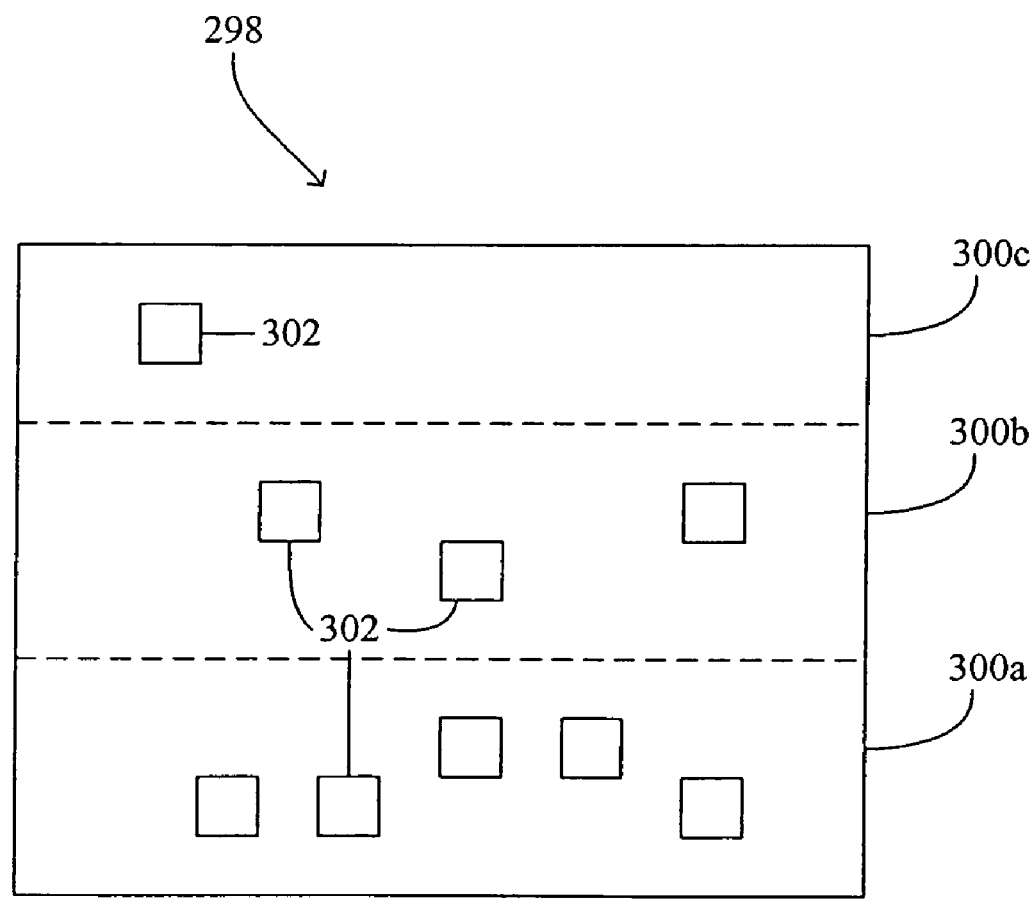
FIG. 17 is an illustration of interactors on a detection field for marking events in temporal flows.

In this second example, an interactor system such as interactor system 24 is controlled to "mark" or "log" events in a videotape. In FIG. 17, a detection field 298 includes three zones 300a, 300b, 300c and a number of interactors 302. Each of the interactors has a semantic meaning due to its identity, due to their position in the various zones 300a, 300b, and 300c of the detection field 298, and due to their amount or "type" of time they have been present in the detection field (up/down or, as sometimes referred to herein, exit/enter). The various objects 302 can be used mark and control the temporal flow of a recorded medium as described previously with regards to FIG. 2.

As used herein, "temporal flow" will refer to the flow of events, either in real time or in some other time related context. Therefore, either events can be marked in a temporal flow, or events that have been previously recorded or that are being concurrently recorded can be marked in the temporal flow. The "marking" may only be literally temporal (such as in real time), temporal with regard to a specific origin (such as seconds since the start of the tape), or temporal only in the sense that the measure could be translated into a temporal stream (such as feet of tape or frame number). While the present example relates to a recorded video medium, the marking and control of the temporal flow of another medium, such as an audio medium, may also be carried out.

Figure 18:
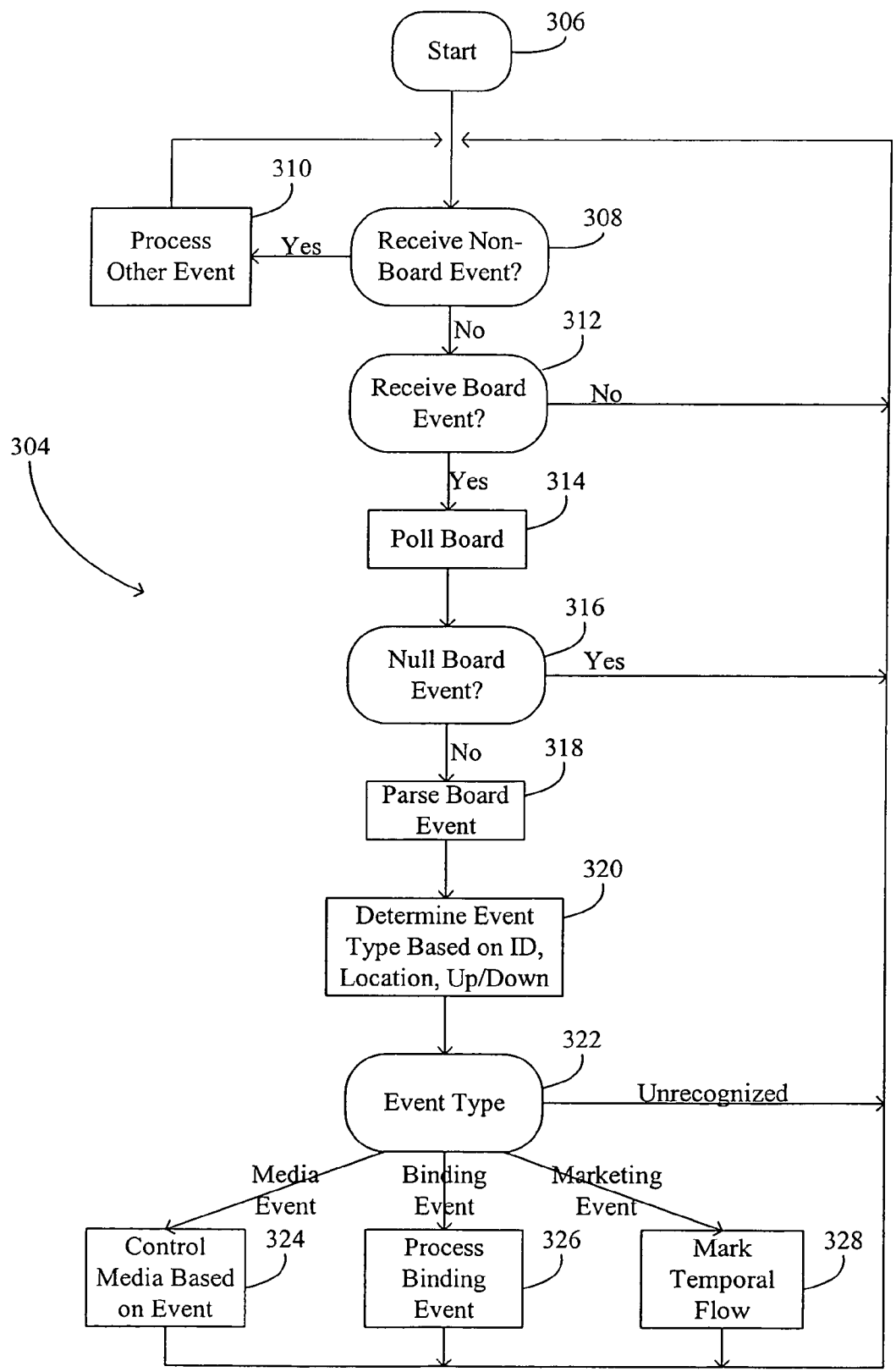
FIG. 18 is a flow diagram of an event marker system in accordance with the present invention.

In FIG. 18, a computer implemented process 304 operating on a computer 28 of FIG. 2 for marking and controlling a temporal flow begins at 306 and, in a step 308, it is determined whether a non-board event has been received. If so, this "other" type of event is processed in a step 310 and process control is returned to step 308. Next, in a step 312, it is determined whether a board event has been received. If not, process control is returned to step 308. If a board event has been received, the board is polled in a step 314 and it is determined in a step 316 whether a null board event has been received. A null board event may be that no interactors have been perceived in the detection field, or that no changes have been detected in the state of the interactors in the detection field. If so, process control returns to 308. However, if a board event has been received (i.e. it is not a null board event), the board event is parsed in a step 318. Next, in a step 320, it is determined the event type based upon any combination (e.g., any one, any two, or all three) of the interactor's ID, location, and whether it is up or down (i.e. the time period of the interactor in the detection field). Next, in a step 332, the parsed event is processed by type. If it is a media event, a step 324 controls the media based upon the event. If it is a binding event, a step 326 processes the binding event. If it is a marking event, a step 324 marks the temporal flow. In this instance, the temporal flow is marked by receiving frame information from the video player and storing that frame information along with the event type in a database on the computer 28. If the event type is unrecognized, or after steps 324, 326, or 328 have been processed, process control returns to step 308.

Figure 19:
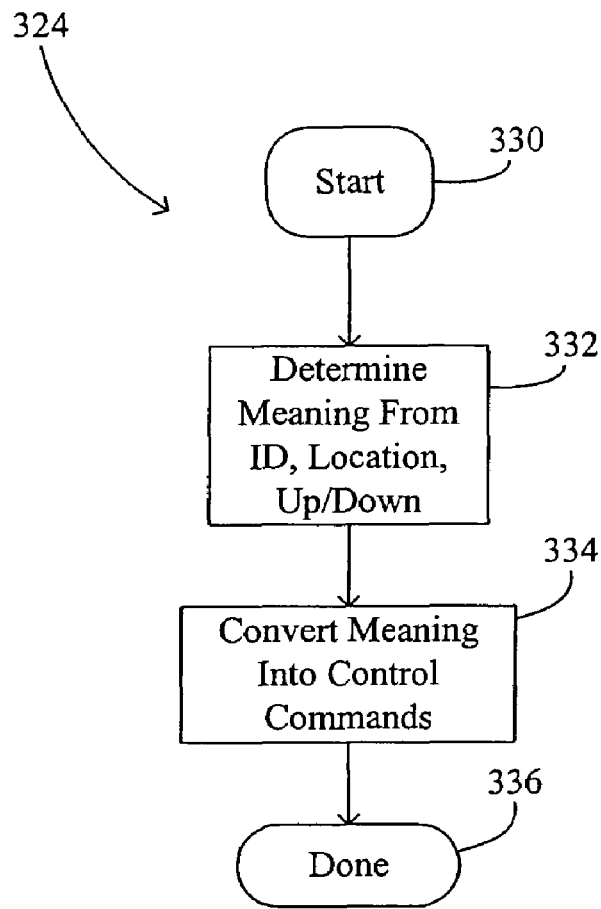
FIG. 19 is a flow diagram illustrating the "Control Media Based On Event" step of FIG. 18.

Step 324 of FIG. 18 is illustrated in greater detail in FIG. 19. To control a media based upon the event, process 324 begins at 320 and, in a step 332, the meaning of the interactor in the detection field is determined from its ID, its location, and whether it is up or down. The meaning may be determined based upon any combination of the presence of the interactor (up/down), the ID of the interactor, and the location of the interactor. Next, in a step 334, this meaning is converted into control commands (e.g. stop, fast-forward, speed etc.) for the media system. The process 324 is completed at 336.

Figure 20:
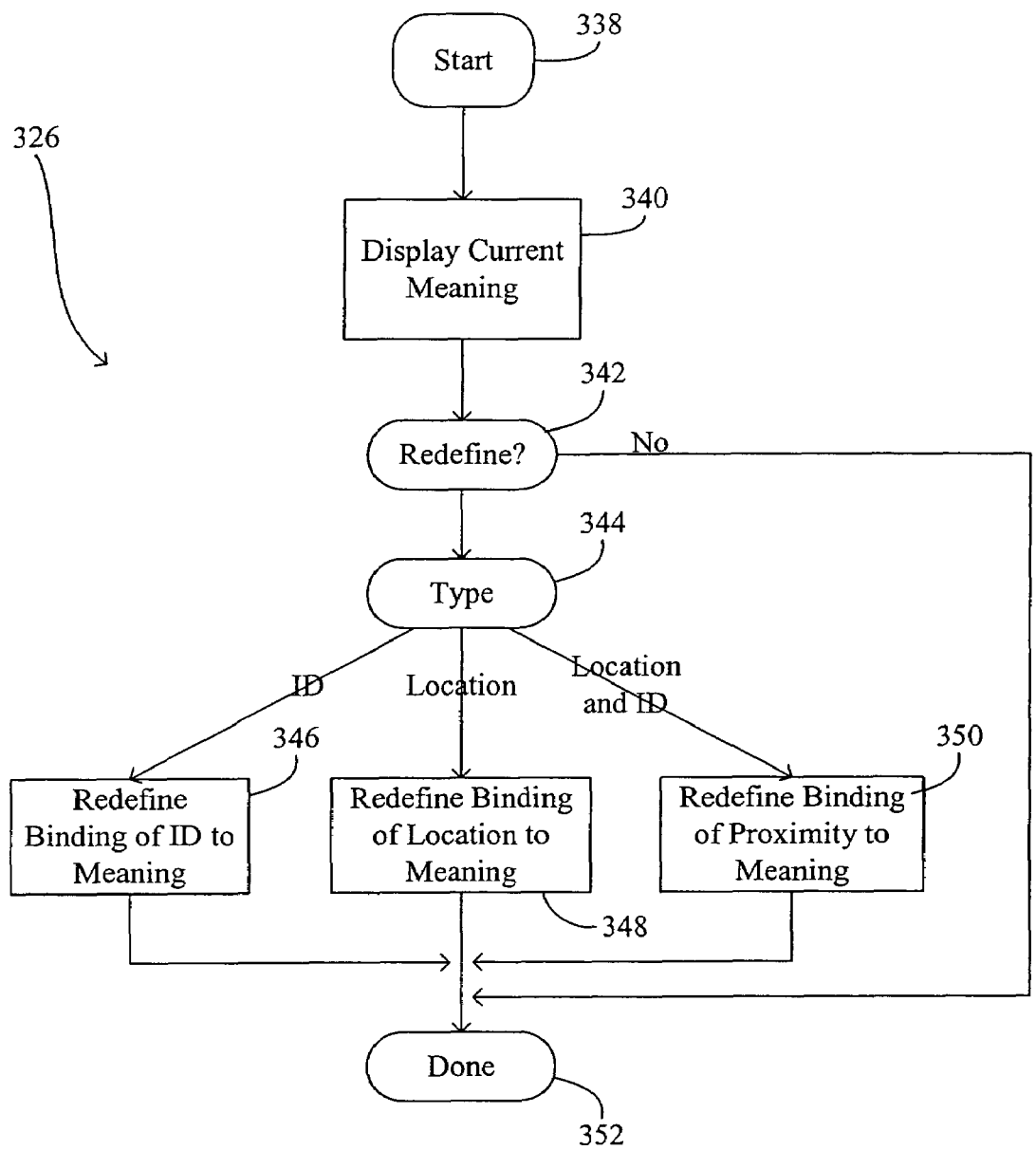
FIG. 20 is a flow diagram illustrating the "Process Binding Event" step of FIG. 18.

Step 326 of FIG. 18 is illustrated in greater detail in FIG. 20. Process 326 begins at 338 and, in a step 340, the current meaning of the interactor is displayed. The system then determines whether the user wants to redefine the current meaning of the interactor in a step 342. If not, the process 326 is completed as indicated at 352. If the user does wish to redefine the meaning of a particular interactor, it is determined in a step 344 what type of redefinition is desired. If the meaning of the location is "re-bind the ID", then a step 346 redefines the binding of the ID to the meaning. If the meaning of the object is "re-define the location", the system redefines the binding of the location to the meaning in a step 348. If the meaning of the location or the ID is "re-define the proximity", a step 350 is redefines the binding of the proximity to the meaning. As used herein, a definition for "proximity" is a measure of distance between the interactor and the detection field, or the position of an interactor in a detection space. After the completion of the binding steps of 346, 348, or 350, the process 326 itself is completed as indicated at 352.

Figure 21:
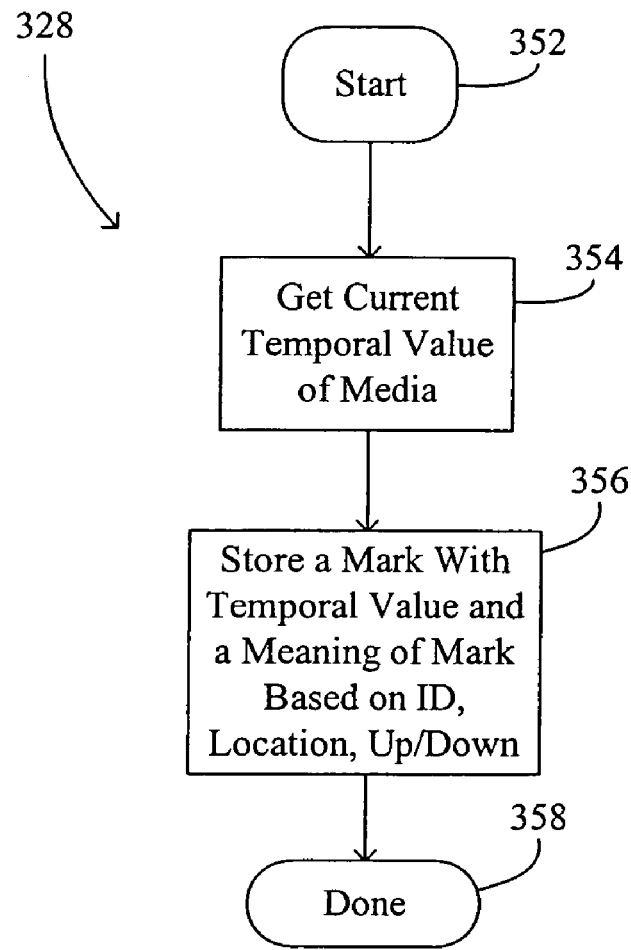
FIG. 21 is a flow diagram of the "Mark Temporal Flow" step of FIG. 18.

The step 238 of FIG. 18 is illustrated in greater detail in FIG. 21. The process 328 begins at 352 and, in a step 354, the current temporal value of the media is retrieved. Next, in a step 356, a mark is stored with a temporal value and meaning based upon the ID, location, and how the interactor has been placed "up or down" in the detection field. The process 328 is then completed at 358.

Figure 22:
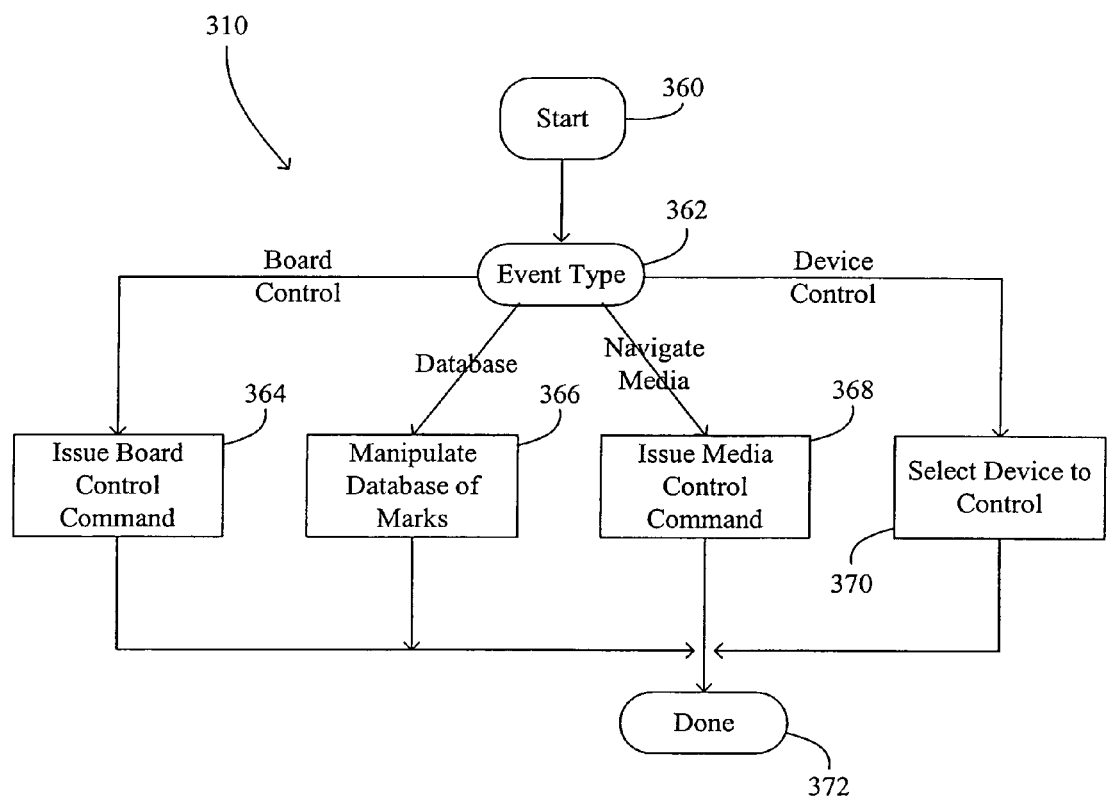
FIG. 22 is a flow diagram illustrating the "Process Other Event" step of FIG. 18.

The step 310 of FIG. 18 is illustrated in greater detail in FIG. 22. The process 310 begins at 360 and, in a step 362, an event type is determined. If the event type is board control, a step 364 issues board control commands. If the event type is "database," a step 366 manipulates the database of marks. If the event type is "navigate media," a media control command is issued by step 368. If the event type is "device control," a device to control is selected in a step 370. After the completion of steps 364, 366, 368, or 370, the process 310 is completed as indicated at 372.

While this invention has been described in terms of several preferred embodiments and two specific examples, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for controlling a computerized system comprising the steps of:

providing a detection space;

placing a physical and identifiable member having a semantic meaning independent of said member within said detection space, said semantic meaning being dependent upon an identity of a user who placed said member within said detection space;

determining said semantic meaning of said member within a given semantic context; and controlling a computerized system in response to said semantic meaning of said identifiable member.

2. A method for controlling a computerized system as recited in claim 1 wherein said step of determining said semantic meaning of said member comprises determining a selected position of said member in said detection space.

3. A method for controlling a computerized system as recited in claim 1 wherein said step of determining said semantic meaning of said member comprises determining an identification of said member.

4. A method for controlling a computerized system as recited in claim 1 wherein said step of determining said semantic meaning of said member comprises determining a temporal relationship of said member placed in said detection space.

5. A method for controlling a computerized system as recited in claim 1 wherein said step of determining said semantic meaning of said member comprises: determining a selected position of said member in said detection space; determining an identification of said member; and determining a temporal relationship of said member placed in said detection space.

6. A method for controlling a computerized system as recited in claim 1 comprising placing a plurality of physical and identifiable members within said detection space and determining the semantic meanings of said plurality of members.

7. A method for controlling a computerized system as recited in claim 1 further comprising the step of providing a network of coupled workstations each having access to said detection space such that a user may place at least one said member within said detection space.

8. A method for controlling a computerized system as recited in claim 1 wherein said step of controlling a computerized system comprises creating a control input indicative of said semantic meaning of said member, and wherein the method further comprises the steps of providing an application system coupled to said computerized system and controlling said application system by means of said control input.

9. A method for controlling a computerized system as recited in claim 8 wherein said application system is a videotape application system means for marking events in a videotape.

10. A method for controlling a computerized system as recited in claim 8 wherein said application system is an audio application system means for providing audio sounds dependent upon a plurality of members placed in said detection space.

11. A system for marking events occurring in a recorded media comprising:
a display system for displaying a recording, said system providing an event timing information concerning events occurring in said recording, said system responsive to at least control media events, bind events, and mark temporal flow events;
a plurality of event markers, each of which is provided with an event marker identifier;
an event field receptive to said event markers and operative to provide said event marker identifier in an event marker time; and
a processor coupled to said display system to receive said event timing information and said event marker identifier, and operative to mark an event based upon said event timing information, said event marker time, and said event marker identifier.

12. A system for marking events occurring in a recorded media as recited in claim 11 wherein said plurality of event markers are operable by a plurality of users for making said plurality of event markers removably received by said event field.

13. A system for marking events occurring in a recorded media as recited in claim 11 wherein said plurality of event markers each comprise at least one distinct visual feature for metaphorically representing said event marker identifier.

14. A system for marking events occurring in a recorded media as recited in claim 11 wherein said plurality of event markers each comprising identification circuitry and wherein said event field comprises internal circuitry adapted for connection with said identification circuitry of said plurality of event markers.

15. A system for marking events occurring in a recorded media as recited in claim 14 wherein said event field comprises a plurality of positions at which said event markers may be selectively manually removably placed in order to at least temporarily connect said identification circuitry of said event markers with said internal circuitry of said event field.

16. A computer program product for controlling a computerized system, the computer program product being embodied in a computer readable medium and comprising computer instructions for:
providing a detection space;
placing a physical and identifiable member having a semantic meaning independent of said member within said detection space, said semantic meaning being dependent upon an identity of a user who placed said member within said detection space;
determining said semantic meaning of said member within a given semantic context; and
controlling a computerized system in response to said semantic meaning of said identifiable member.

17. A computer program product as recited in claim 16, wherein said application system is a videotape application system means for marking events in a videotape.

18. A method for marking events occurring in a recorded media comprising:
displaying a recording;
ascertaining an event timing information concerning events occurring in said recording;
receiving an event marker identifier in an event marker time, wherein the event marker includes an event marker identifier;
and marking an event based upon said event timing information, said event marker time, and said event marker identifier.

19. The method of claim 18 wherein said events occurring in said recording are at least one of control media events, bind events, and mark temporal flow events.

20. A computer program product for marking events occurring in a recorded media, the computer program product being embodied in a computer readable medium and comprising computer instructions for:
displaying a recording;
ascertaining an event timing information concerning events occurring in said recording;
receiving an event marker identifier in an event marker time, wherein the event marker includes an event marker identifier;
and marking an event based upon said event timing information, said event marker time, and said event marker identifier.

* * * * *

UNITED STATES PATENT AND TRADEMARK OFFICE
CERTIFICATE OF CORRECTION

| | |
|---|---|
| PATENT NO. | : 7,545,359 B1 |
| APPLICATION NO. | : 11/061789 |
| DATED | : June 9, 2009 |
| INVENTOR(S) | : Jonathan R. Cohen et al. |

It is certified that error appears in the above-identified patent and that said Letters Patent is hereby corrected as shown below:

In column 2, line 39-40, delete "This marble answering machine has been publicly known at least as of June, 1993." and insert the same on Line 38, after "again." as the continuation of the paragraph.

In column 4, line 56, after "invention" delete "." and insert -- ; --, therefor.

In column 16, line 44, after "marker" (first occurrence) delete "identifier".

Signed and Sealed this

Eleventh Day of August, 2009

David J. Kappos
*Director of the United States Patent and Trademark Office*